(12) United States Patent
Boyapalle et al.

(10) Patent No.: US 11,963,244 B2
(45) Date of Patent: Apr. 16, 2024

(54) SYSTEM AND METHOD OF ROUTING COMMUNICATION OF ENDPOINT COMPUTING DEVICES THROUGH 5G NETWORK SLICE AS A SERVICE

(71) Applicant: Dell Products, LP, Round Rock, TX (US)

(72) Inventors: Anantha K. Boyapalle, Cedar Park, TX (US); Liam B. Quinn, Austin, TX (US); Jace W. Files, Round Rock, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 672 days.

(21) Appl. No.: 17/075,205

(22) Filed: Oct. 20, 2020

(65) Prior Publication Data

US 2022/0124844 A1 Apr. 21, 2022

(51) Int. Cl.
| | | |
|---|---|---|
| *H04W 76/12* | (2018.01) | |
| *H04W 48/16* | (2009.01) | |
| *H04W 92/02* | (2009.01) | |

(52) U.S. Cl.
CPC ........... *H04W 76/12* (2018.02); *H04W 48/16* (2013.01); *H04W 92/02* (2013.01)

(58) Field of Classification Search
CPC ...... H04W 92/02; H04W 76/12; H04W 48/16
USPC ........................................................ 370/328
See application file for complete search history.

(56) References Cited

U.S. PATENT DOCUMENTS

| | | |
|---|---|---|
| 2019/0238407 A1 | 8/2019 | Papa |
| 2019/0289470 A1 | 9/2019 | Vaidya |
| 2019/0320494 A1* | 10/2019 | Jayawardene ...... H04L 27/2637 |

FOREIGN PATENT DOCUMENTS

| | | |
|---|---|---|
| KR | 20170052446 A | 5/2017 |
| WO | 2017/123277 A1 | 7/2017 |
| WO | 2018/125686 A2 | 7/2018 |
| WO | 2019/104280 A1 | 5/2019 |

OTHER PUBLICATIONS

K. Sparks, et al., "5G Network Slicing Whitepaper," 34 pages, Feb. 19, 2018, https://transition.fcc.gov/bureaus/oet/tac/tacdocs/reports/2018/5G-Network-Slicing-Whitepaper-Finalv80.pdf.

\* cited by examiner

*Primary Examiner* — Chuck Huynh
(74) *Attorney, Agent, or Firm* — Prol Intellectual Property Law, PLLC; H. Kenneth Prol

(57) ABSTRACT

An information handling system operating a 5G network slice hub service system may comprise a wireless wide area network (WWAN) interface device transceiving data with a radio access network (RAN) within a RAN network slice, a wireless local area network (WLAN) interface device transceiving data with an endpoint computing device, a processor instructing a software defined network (SDN) controller to route data transceived within a set of RAN network slices at the WWAN interface device to be extended via a subset of radio frequencies designated for one or more endpoint device at the WLAN interface device by the SDN controller to the one or more endpoint devices, and routing data on the extended RAN network slice between the endpoint device and the WWAN interface device interfacing with the RAN.

13 Claims, 6 Drawing Sheets

SYSTEM AND METHOD OF ROUTING COMMUNICATION OF ENDPOINT COMPUTING DEVICES THROUGH 5G NETWORK SLICE AS A SERVICE

Related subject matter is contained in the following co-pending applications:

U.S. application Ser. No. 16/776,502, filed Jan. 29, 2020, entitled "ENDPOINT COMPUTING DEVICE MULTI-NETWORK SLICE UTILIZATION SYSTEM" invented by Liam B. Quinn and assigned to the assignee hereof.

FIELD OF THE DISCLOSURE

The present disclosure generally relates to information handling systems and more specifically relates to information handling systems that facilitate wireless connectivity via Radio Access Network (RAN) systems to communicatively coupled endpoint computing devices.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may conduct one or more forms of wireless network communication.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
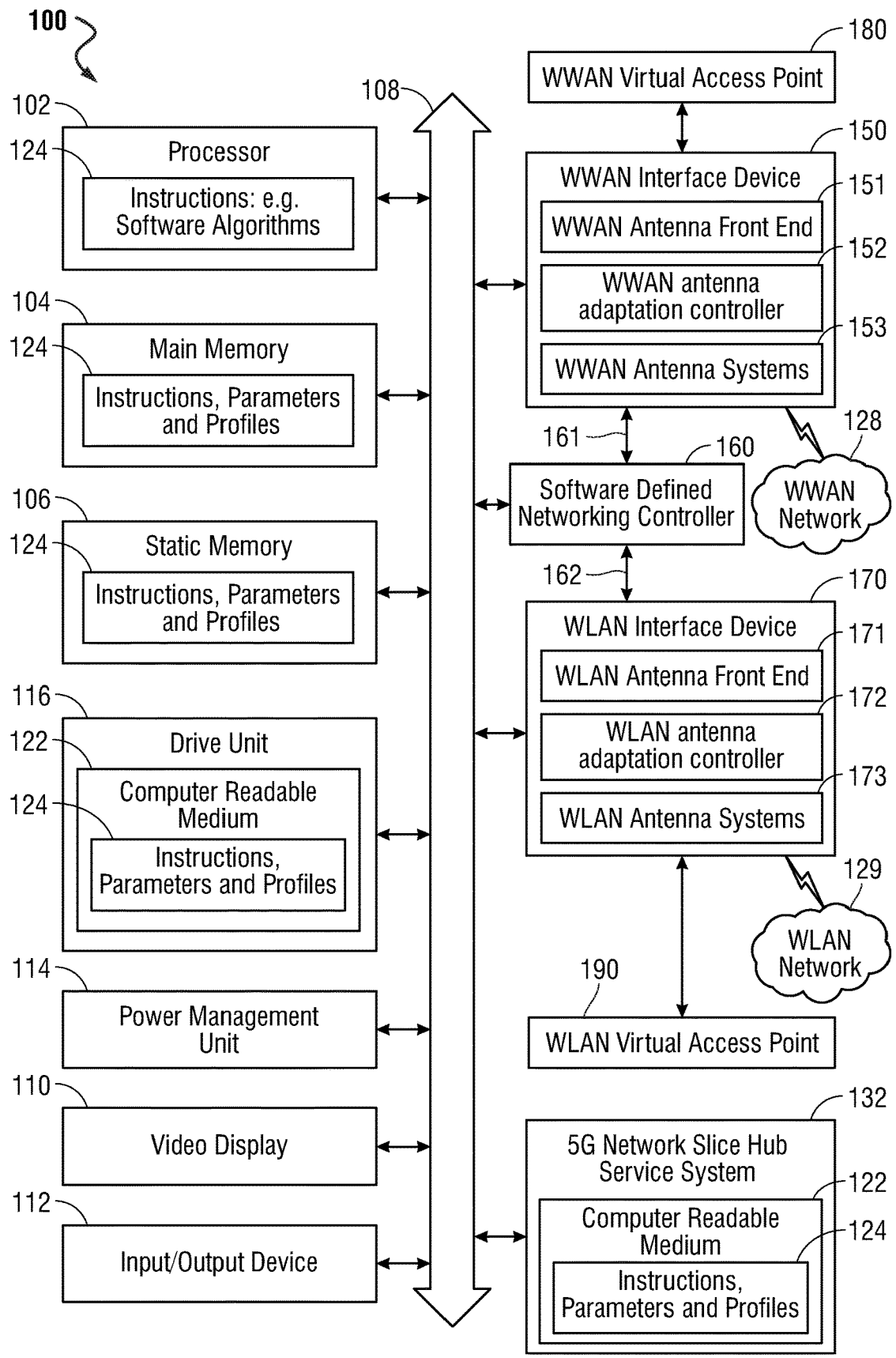
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems such as, for example, laptop/notebook computing devices, tablet computing devices, mobile phones, Internet of Things (IoT) computing devices, or other endpoint computing devices known in the art, often utilize wireless networks in order to enable mobility of those endpoint computing devices while exchanging data, as well as to exchange data from remote locations. Wireless networking technology has begun to transition from 4G millimeter wave (4G) wireless technology to 5G millimeter wave (5G) wireless technology. Current conventional 5G wireless technology includes a 5G core network system that is operated by a wireless provider (e.g., AT&T® Mobility of Atlanta, Georgia, United States; SPRINT® Corporation of Overland Park, Kansas, United States; VERIZON® Wireless of New York, New York, United States, etc.), and that operates with a 5G Radio Access Network (RAN) system that includes cellular tower systems that operate to exchange wireless communication for the endpoint computing devices discussed above. Such 5G communications typically provide greater range of communication frequencies, higher bandwidth, and lower latency over shorter distances.

One technique for exchanging wireless communications via the 5G core network system includes the use of network slicing, which enables multiplexing of virtualized and independent logical networks on the same physical network infrastructure. This 5G network slicing approach allows for leveraging the increased bandwidth available via the 5G communication system. Each network slice may provide a network (e.g., a portion of the wireless spectrum available from the 5G core network system) with particular networking characteristics to any of a plurality of endpoint computing devices, via the 5G RAN. Such network slicing technology may provide connectivity meeting performance metrics requirements of one or more applications operating on an information handling system such as a mobile computing device (e.g., laptop or tablet).

It may be desirable in some scenarios to allow information handling systems not capable of accessing 5G network slices themselves to access the network slices via another information handling system acting as a 5G network slice hub. For example, when meeting with clients or customers in a high wireless-traffic setting (e.g., a conference with limited wireless routers available to serve all conference participants), it may be difficult for all participants to access sufficient bandwidth to run all applications needed for a successful meeting. More specifically, one or more of the meeting participants in such a scenario may be running applications with high-bandwidth, and low-latency requirements, such as Virtual Reality (VR) applications, Augmented Reality (AR) applications, or other graphic-intensive applications such as streaming 4K video. In other cases, several participants may need access to a single network in order to exchange volumes of documents or datasets, requiring several wireless signals that could interfere with one another. A solution is needed to share 5G network slices with multiple endpoint computing devices (e.g., meeting participant devices), incapable of accessing 5G network slices themselves.

Embodiments of the present disclosure address this issue by acting as a hub for the delivery of 5G network slices to one or more communicatively coupled endpoint computing devices. The 5G network slice hub service system in embodiments described herein may operate on any mobile computing device capable of communication with a 5G cellular network. The network interface device of such 5G network slice hub in embodiments may enlist a local wireless router to which the endpoint computing devices have access to advertise the capabilities of one or more network slices the hub can access. One or more endpoint computing devices may select the one or more network slices available, and request access to that network slice of the 5G network via the hub information handling system. The 5G network slice hub service system may establish a wireless link with and authenticate the requesting endpoint computing device in response. Upon successful authentication, the 5G network slice hub service system may enable communication between the endpoint computing device and the RAN system managing the requested network slice. In such a way, the 5G network slice hub service system may provide each requesting endpoint computing device with a network slice having capabilities tailored to the needs of each endpoint computing device while avoiding cross-traffic between the endpoint computing devices.

FIG. 1 illustrates an information handling system 100 according to several aspects of the present disclosure. The information handling system 100 as illustrated in FIG. 1 may be communicatively coupled to a WWAN network 128 or WLAN network 129 and to one or more endpoint computing devices via one or more virtual access points 180. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In an embodiment, the information handling system may include a 5G network slice hub service system 132 that may be any device or devices that execute instructions, parameter, and profiles 124 so that voice and data communication requests from endpoint computing device(s) may be received and routed to a WWAN communication network 128, via one or more WWAN virtual access points 180, or may be received and routed to a WLAN network 129, via one or more WLAN virtual access points 190, as described herein. The execution of the 5G network slice hub service system 132 may serve as a hub for the endpoint computing device(s) to be communicatively coupled, for example, to a private LTE communication network, a public WiFi communication network, a private WiFi communication network, a 4G LTE public communication network, or a 5G millimeter-wave (mm-wave) communication network, among other types of public and private communication networks, via one or more virtual access points 180 or 190, managed by the 5G network slice hub service system 132, and a software defined networking (SDN) controller 160.

The information handling system 100 may include a memory 104, (volatile (e.g. random-access memory, etc.), nonvolatile memory (read-only memory, flash memory etc.) or any combination thereof), one or more processing resources, such as a central processing unit (CPU), a graphics processing unit (GPU), either of which may be the processor 102 illustrated in FIG. 1, hardware or software control logic, or any combination thereof. Additional components of the information handling system 100 may include one or more storage devices 106 or 116, a power management unit 114 supplying power to the software defined networking controller 160, the WWAN interface device 150, or WLAN interface device 170, one or more communications ports for communicating with external devices, as well as, various input and output (I/O) devices 112, such as a keyboard, a mouse, or any combination thereof. The information handling system 100 may further include a video display 110. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems 100 according to various embodiments herein. In some embodiments, it is understood any or all portions of code instructions 124 may operate on a plurality of information handling systems 100.

The information handling system 100 may include a processor 102 such as a central processing unit (CPU), a GPU, embedded controllers or control logic or some combination of the same. Any of the processing resources may operate to execute code that is either firmware or software code. Moreover, the information handling system 100 may include memory such as main memory 104, static memory 106, containing computer readable medium 122 storing instructions 124. Instructions 124 may include a 5G network slice hub service system 132, operating system (OS) software, application software, BIOS software, or other software applications or drivers detectable by processor type 102. The disk drive unit 116 and static memory 106 may also contain space for data storage. The instructions 124 in an embodiment may reside completely, or at least partially, within the main memory 104, the static memory 106, and/or within the disk drive 116 during execution by the processor 102. The information handling system 100 may also include one or more buses 108 operable to transmit communications between the various hardware components such as any combination of various input and output (I/O) devices, display 110, WWAN interface device 150, WLAN interface device 160, or the like.

Information handling system 100 in an embodiment may comprise a network slice hub, as described in greater detail herein, or may, in some embodiments, comprise a client device seeking access to a 5G network slice via a network slice hub. The information handling system 100 in such an embodiment may operate on wireless links to connect with virtual access points established at the network slice hub by 5G network slice hub service system 132.

The WWAN interface device 150 may provide connectivity of the information handling system 100 to one or more endpoint computing devices via one or more WWAN virtual access points 180 in an embodiment. In another aspect of an embodiment, the WWAN interface device 150 may also provide connectivity of the information handling system 100 to one of a plurality of cellular, WWAN communication networks 128. The WWAN communication network 128 in some embodiments may be a wired wide area network (WAN), a private LTE communication network, a 4G LTE public communication network, or a 5G millimeter-wave (mm-wave) communication network, or other cellular communication networks. Connectivity to any of a plurality of WWAN networks 128 or to one or more endpoint computing devices in an embodiment may be via wired or wireless connection. In some aspects of the present disclosure, the WWAN interface device 150 may operate two or more wireless links. In other aspects of the present disclosure, the information handling system 100 may include a plurality of WWAN interface devices.

The WWAN interface device 150 may operate in accordance with any cellular wireless data communication standards. WWAN interface device 150, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the WWAN interface device 150 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards. NRFR2 may include radio frequencies above 6 GHz, made available within the emerging 5G communications standard. Communications within NRFR1 may be enabled through the use of either an eNodeB executing an evolved packet core of an existing LTE system, or a Next Generation Node B (gNodeB) executing the next generation packet core of the 5G cellular standard.

Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands. WWAN may use the Unlicensed National Information Infrastructure (U-NII) band which typically operates in the ~5 GHz frequency band such as 802.11 a/h/j/n/ac (e.g., center frequencies between 5.170-5.785 GHz). It is understood that any number of available channels may be available under the 5 GHz shared communication frequency band. WWAN may operate in a number of bands, some of which are proprietary but may include a wireless communication frequency band at approximately 2.5 GHz band for example. In additional examples, WWAN carrier bands may operate at frequency bands of approximately 700 MHz, 800 MHz, 1900 MHz, or 1700/2100 MHz for example as well.

In an embodiment, the WWAN interface device 150 may be communicatively coupled to an array of WWAN antenna systems 153 used to provide a communication channel to an endpoint device, via a WWAN virtual access point 180, and to provide a separate communication channel to the WWAN network 128. Such communications channels may be found in any communication network described herein. The WWAN antennas 153 may support a 5G wireless communication protocol so that relatively higher amounts of data may be transceived by the information handling system 100 to any WWAN communication network to which the information handling system 100 is communicatively coupled in some embodiments.

The WWAN antenna adaptation controller 152 may execute instructions as disclosed herein for monitoring wireless link state information, endpoint configuration data, network slice data, or other input data to generate channel estimation and determine antenna radiation patterns. For example, instructions or a controller may execute software or firmware applications or algorithms which utilize one or more wireless links for wireless communications via the WWAN wireless interface device 150 and the plurality of WWAN antenna systems 153 for the plurality of supported wireless protocols as well as other aspects or components.

The WWAN interface device 150 in an embodiment may further include a WWAN antenna front end system 151 which may operate to modulate and demodulate signals transceived within a WWAN format, set signal transmission power levels or sensitivity to signal reception, select channels or frequency bands, and conduct other functions in support of a wireless transmission from the WWAN virtual access point 180 to the WWAN communication network 128. In one aspect of an embodiment, the WWAN antenna front end 151 may receive communication frames from the software defined networking (SDN) controller 160 and instructions to forward those frames to the WWAN network 128 within a specified radio frequency spectrum sub-portion (e.g., 5G NRFR1 low-band below 1 GHz, 5G NRFR1 mid-band between 1 GHz and 6 GHz, or 5G NRFR2 high-band above 6 GHz). In another aspect of an embodiment, the WWAN antenna front end 151 may receive communication frames from the WWAN network 128 within a specified radio frequency spectrum sub-portion (e.g., 5G NRFR1 low-band below 1 GHz, 5G NRFR1 mid-band between 1 GHz and 6 GHz, or 5G NRFR2 high-band above 6 GHz) and forward the received frames to the SDN controller 160, along with an identification of the radio frequency at which the frames were received.

The WLAN interface device 170 may provide connectivity of the information handling system 100 to one or more endpoint computing devices via one or more WLAN virtual access points 190 in an embodiment. In another aspect of an embodiment, the WLAN interface device 170 may also provide connectivity of the information handling system 100 to one of a plurality of WLAN communication networks 129. In other embodiments, the communication network 129 may comprise a wired local area network (LAN), a wireless personal area network (WPAN), a public WiFi communication network, a private WiFi communication network, a public WiMAX communication network, or other non-cellular communication networks. Connectivity to any of a plurality of networks 129 or to one or more endpoint computing devices in an embodiment may be via wired or wireless connection. In some aspects of the present disclosure, the WLAN interface device 170 may operate two or more wireless links. In other aspects of the present disclosure, the information handling system 100 may include a plurality of WLAN interface devices.

The WLAN interface device 170 may operate in accordance with any non-cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band, or a 60 GHz band.

In an embodiment, the WLAN interface device 170 may be communicatively coupled to an array of WLAN antenna systems 173 used to provide a communication channel to an endpoint device, via a WLAN virtual access point 190, and to provide a separate communication channel to the WLAN network 129. Such communications channels may be found in any communication network described herein. The WLAN antenna adaptation controller 172 may execute instructions as disclosed herein for monitoring wireless link state information, endpoint configuration data, or other input data to generate channel estimation and determine antenna radiation patterns. For example, instructions or a controller may execute software or firmware applications or algorithms which utilize one or more wireless links for wireless communications via the WLAN wireless interface device 170 and the plurality of WLAN antenna systems 173 for the plurality of supported wireless protocols as well as other aspects or components.

The WLAN interface device 170 in an embodiment may further include a WLAN antenna front end system 171 which may operate to modulate and demodulate signals transceived within a WLAN format, set signal transmission power levels or sensitivity to signal reception, select channels or frequency bands, and conduct other functions in support of a wireless transmission from the WLAN virtual access point 190 to the WLAN communication network 129. In one aspect of an embodiment, the WLAN antenna front end 171 may receive communication packets from the software defined networking (SDN) controller 160 and instructions to forward those packets to the WLAN network 128 within a specified radio frequency spectrum sub-portion (e.g., 2.4 GHz range, 5 GHz range, or 60 GHz range). In another aspect of an embodiment, the WLAN antenna front end 171 may receive communication packets from the WLAN network 129 within a specified radio frequency spectrum sub-portion (e.g., 2.4 GHz range, 5 GHz range, or 60 GHz range) and forward the received packets to the SDN controller 160, along with an identification of the radio frequency at which the packets were received.

The WWAN interface device 150 may be communicatively coupled to the SDN controller 160 via bus 108 or via a separate communication line 161. Similarly, the WLAN interface device 170 may be communicatively coupled to the SDN controller 160 via bus 108 or via a separate communication line 162. The communication lines 161 or 162 and bus 108 in an embodiment may support one or more protocols for routing packets/frames between or among network interface devices via an SDN controller 160, such as, for example, the OpenFlow® protocol, or the Interface to the Routing System (i2rs) protocol. It is contemplated that communication lines 161 or 162 or bus 108 may support any other currently known or later developed protocols for control of a network interface device by an SDN controller 160. The SDN controller 160 in an embodiment may include, for example, an OpenDaylight® controller, a Nicira® Networks/VMWare® NOX™ controller, a NTT®/Google® ONIX® controller, the NEC® Trema® controller, the NTT® Ryu® controller, or open-sourced controllers such as POX or Beacon controllers. In some embodiments, the SDN controller 160 may comprise a software-defined wide-area network (SD-WAN) controller operating to unify networking connections covering a wide geographical area within an enterprise.

The SDN controller 160 in an embodiment may operate, in part, to route data incoming from or outgoing to a specifically identified endpoint computing device such that the data is only transceived within a radio frequency sub-portion assigned to that specifically identified endpoint computing device by the 5G network slice hub service system 132. This may be referred to herein as establishing a virtual access point (e.g., WWAN virtual access point 180 or WLAN virtual access point 190) for communication with only the specifically identified endpoint computing device.

The SDN controller 160 in an embodiment may operate in a control plane layer (e.g., via software), in part, to route incoming packets/frames to a network interface device for transmission in a specific network slice. For example, the SDN controller 160 may operate to retrieve data frames received at a WWAN interface device, within a preset or identified radio frequency sub-portion (e.g., network slice), and route the received frames back to the WWAN interface device, for transmission only within that preset or identified radio frequency sub-portion. In such a way, the SDN controller 160 may cause data frames received via a WWAN interface device 150 within a specific network slice or specifically identified radio frequency sub-portion to be transmitted by the WWAN interface device 150 only within the same network slice. Each of the WWAN virtual access points 180 in an embodiment may enable communication in a separate network slice via a single radio of the WWAN interface device 150. For example, a first WWAN virtual access point in an embodiment may transceive in the radio frequency spectrum sub-portion below 1 GHz (e.g., 5G low-band or LTE), and a second WWAN virtual access point may transceive in the radio frequency sub-portion above 6 GHz (e.g., 5G high-band or mmWave). These are only two examples of available but separate radio frequency spectrum sub-portions or network slices, and, as described above, the WWAN interface device 150 may be capable of transceiving via the WWAN virtual access point(s) 180 in accordance with any cellular wireless data communication standards.

The WWAN interface device 150 in an embodiment, acting as an access point between a plurality of endpoint computing devices and the WWAN network 128, may be capable of transceiving in a broad radio frequency spectrum. This software-driven routing of data frames for receipt and transmission only within the specified network slice effectively narrows the radio frequency spectrum for which the WWAN interface device 150 may act as an access point for any one of the plurality of endpoint computing devices, to a sub-portion of the available spectrum, or a specific network slice. The SDN controller 160 in such an embodiment may repeat this narrowing process for each of several endpoint computing devices, such that the WWAN interface device 150 may only act as an access point for transceiving data with a single endpoint computing device within a specific network slice assigned to that endpoint computing device via the 5G network slice hub service system 132. Because this narrowing is achieved through network virtualization (e.g., software-driven in the control plane via the SDN controller 160), this process of narrowing the range of radio frequency spectrum to a specific network slice assigned to an endpoint computing device may be referred to herein as establishing a WWAN virtual access point 180. Such a virtual access point 180 may represent a software-driven distinction between various network slices, rather than any specific hardware separate and apart from the WWAN interface device 150. In other words, the WWAN virtual access point 180 may comprise a portion of the WWAN interface device 150, or any combination of sub-parts thereof (e.g., WWAN antenna front end 151, WWAN antenna adaptation controller 152, or WWAN antenna system 153).

In another aspect of an embodiment, the SDN controller 160 in an embodiment may operate to transceive data packets between a WLAN interface device 170 and a specifically identified endpoint computing device, within a WLAN frequency band (e.g., 2.4 GHz, 5 GHz, or 60 GHz) assigned to that endpoint computing device by the 5G network slice hub service system 132. In such a way, the SDN controller 160 in an embodiment may route data packets incoming/outgoing from a specific endpoint computing device to be transceived only within the frequency band (e.g., 2.4 GHz, 5 GHz, or 60 GHz) assigned to that specific endpoint computing device. Each of the WLAN virtual access points 190 in an embodiment may enable communication in a separate radio frequency band via a single radio of the WLAN interface device 170. For example, a first WLAN virtual access point in an embodiment may transceive in the 2.4 GHz Wi-Fi band and a second WLAN virtual access point may transceive in the 5 GHz Wi-Fi band. These are only two examples of available but separate radio frequency bands, and, as described above, the WLAN interface device 170 may be capable of transceiving via the WLAN virtual access point(s) 190 in accordance with any non-cellular wireless data communication standards.

The WLAN interface device 170 in an embodiment, acting as an access point for a plurality of endpoint computing devices to access the WWAN network 128 (via the SDN controller 160 and the WWAN interface device 150), may be capable of transceiving in a broad radio frequency spectrum. This software-driven routing of data frames for receipt and transmission only within the specified frequency band assigned to the endpoint computing device effectively narrows the radio frequency spectrum for which the WLAN interface device 170 may act as an access point for any one of the plurality of endpoint computing devices. The SDN controller 160 in such an embodiment may repeat this narrowing process for each of several endpoint computing devices, such that the WLAN interface device 170 may only act as an access point for transceiving data with a single endpoint computing device within a specific frequency band assigned to that endpoint computing device via the 5G network slice hub service system 132. Because this narrowing is achieved through network virtualization (e.g., software-driven in the control plane via the SDN controller 160), this process of narrowing the range of radio frequency spectrum to a specific frequency band assigned to an endpoint computing device may be referred to herein as establishing a WLAN virtual access point 190. Such a WLAN virtual access point 190 may represent a software-driven distinction between various frequency bands, rather than any specific hardware separate and apart from the WLAN interface device 170. In other words, the WLAN virtual access point 190 may comprise a portion of the WLAN interface device 170, or any combination of sub-parts thereof (e.g., WLAN antenna front end 171, WLAN antenna adaptation controller 172, or WLAN antenna system 173).

The SDN controller 160 in an embodiment may also operate, in part, to process and forward received communications between or among a plurality of network interface devices operating according to different communication standards. For example, the SDN controller 160 in an embodiment may operate to receive communication packets via the WLAN virtual access point 190 assigned to a specific endpoint computing device, process those received packets into communication frames compatible with WWAN standards, and forward those processed frames to the WWAN interface device 150 for transmission via the WWAN virtual access point 180 that is also assigned to the specific endpoint computing device. As another example, the SDN controller 160 in an embodiment may operate to receive communication frames from the WWAN network 128 via the WWAN virtual access point 180 assigned to a specific endpoint computing device, process those received frames into communication packets compatible with WLAN standards, and forward those processed packets to the WLAN interface device 170 for transmission via the WLAN virtual access point 190 that is also assigned to the specific endpoint computing device. In such a way, the SDN controller 160 may communicatively couple the WLAN virtual access point 190 to the WWAN virtual access point 180, such that the endpoint computing device may communicate, through information handling system 100, with the WWAN network 128, only within a frequency band and network slice that are both assigned to the endpoint computing device by the 5G network slice hub service system 132. The SDN controller 160 in an embodiment may further include some form of permanent or transient memory for storage of data packets, data frames, or sub-portions thereof during such a processing between WLAN and WWAN formats.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a WWAN network 128 or WLAN network 129 may communicate voice, video or data over the networks 128 or 129. Further, the instructions 124 may be transmitted or received over the WWAN network 128 via the WWAN interface device 150 or may be transmitted or received over the WLAN network 129 via the WLAN interface device 170. The information handling system 100 may include a set of instructions 124 that may be executed to cause the computer system to perform any one or more of the methods or computer-based functions disclosed herein. For example, instructions 124 may execute a 5G network slice hub service system 132, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. Application instructions 124 may also include any application processing drivers, or the like executing on information handling system 100 as an endpoint device or network slice hub.

The 5G network slice hub service system 132 may utilize a computer-readable medium 122 in which one or more sets of instructions 124 such as software may be embedded. The instructions 124 may embody one or more of the methods or logic as described herein. For example, instructions relating to the 5G network slice hub service system 132, software algorithms, processes, and/or methods may be stored here. As explained, some or all of the 5G network slice hub service system 132 may be executed locally or remotely.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions, parameters, and profiles 124 of the 5G network slice hub service system 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the 5G network slice hub service system 132 that may be operably connected to the bus 108. The 5G network slice hub service system 132 may, according to the present description, perform tasks related to apportioning a plurality of network slices among a plurality of communicatively coupled endpoint computing devices to partition available 5G network bandwidth. In some embodiments, the information handling system 100 may comprise one of the endpoint computing devices to which such a network slice may be apportioned by communicatively coupled network slice hub. Based on performance and security requirements at the endpoint computing devices and wireless signal metrics for each of the network slices received, information handling system 100, operating the 5G network slice hub service system 132 may assign portions of the 5G bandwidth it has available with assigned slices matching necessary endpoint computing device performance requirements, if available. In an embodiment, the 5G network slice hub service system 132 may communicate with the main memory 104, the processor 102, the power management unit 114, the video display 110, the input device 112, the SDN controller 160, the WWAN interface device 150, and the WLAN interface device 170, via bus 108, and several forms of communication may be used, including ACPI, SMBus, a 24 MHZ BFSK-coded transmission channel, or shared memory. Driver software, firmware, controllers and the like may communicate with applications on the information handling system 100, and various hardware systems.

During operation, the 5G network slice hub service system 132 of the information handling system 100 may be communicatively coupled to a known number of virtual access points (e.g., WWAN virtual access point 180 or WLAN virtual access point 190). These access points may each be selectively communicatively coupled to an endpoint computing device. The endpoint computing device may be any type of computing device that may be communicatively coupled to a communication network (e.g., WWAN network 128 or WLAN network 129) via execution of the 5G network slice hub service system 132 as described herein. The endpoint devices may be any one of a mobile cell phone, a laptop computing device, a desktop computing device, a tablet device, and a personal digital assistant device, among other types of endpoint devices that are attempting to establish communication with a communication network such as a private LTE communication network, a public WiFi communication network, a private WiFi communication network, a 4G LTE public communication network, or a 5G millimeter-wave (mm-wave) communication network, among other types of public and private communication networks.

In an embodiment, the endpoint device is communicatively coupled to a network slice hub via a virtual access point (e.g., WWAN virtual access point 180 or WLAN virtual access point 190), as described in greater detail above. The virtual access point (e.g., WWAN virtual access point 180 or WLAN virtual access point 190) may be communicatively coupled to the information handling system 100 using any communication protocol including, but not limited to, 5G NR communication protocols, 4G LTE communication protocols, WiFi communication protocols, and citizens broadband radio service (CBRS) communication utilization protocols (such as a private LTE system). During operation, the virtual access points (e.g., WWAN virtual access point 180 or WLAN virtual access point 190) may communicate to the 5G network slice hub service system 132 a request for access to a specifically identified network slice capable of meeting security or performance requirements for that endpoint computing device.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
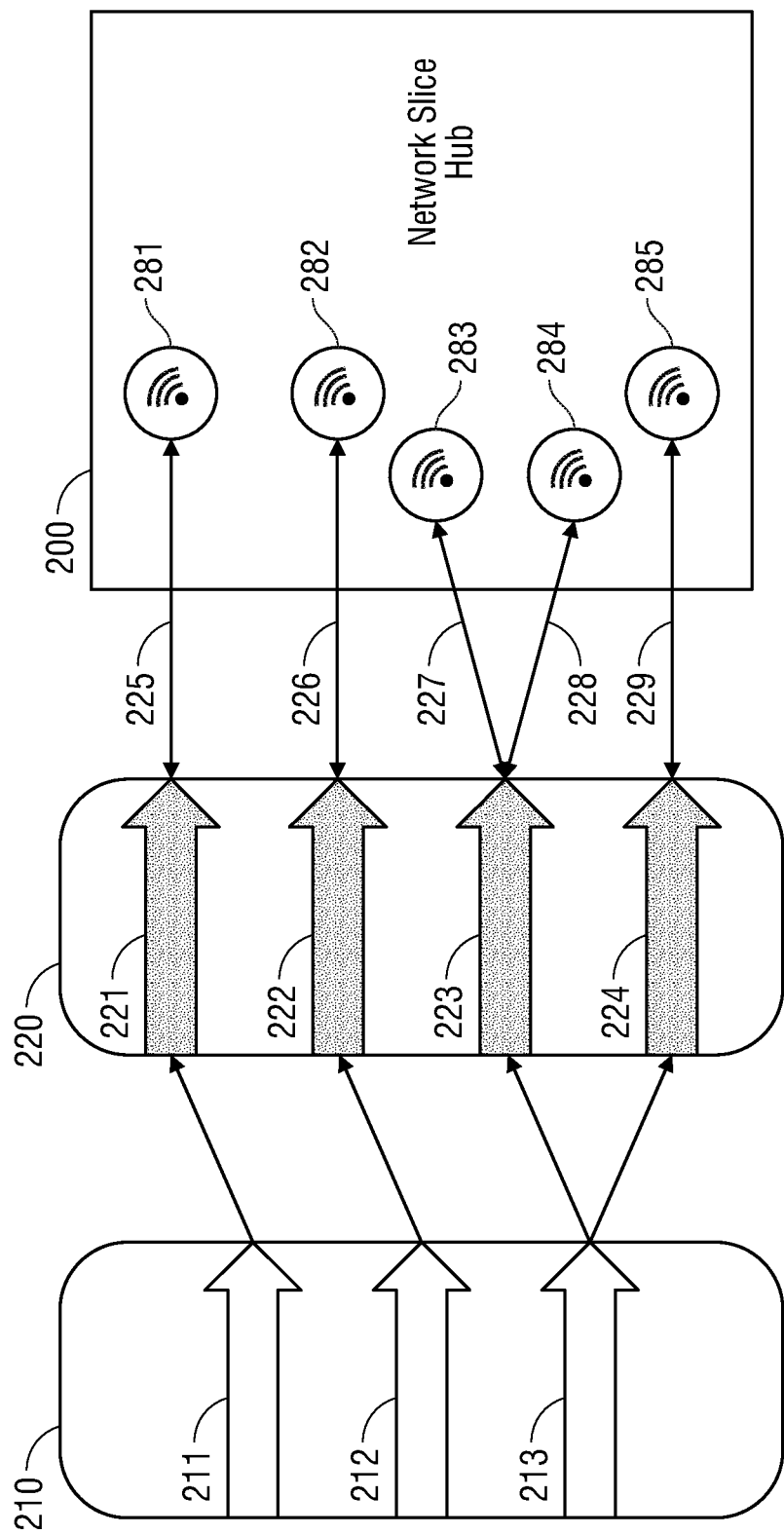
FIG. 2 is a block diagram illustrating a network slice hub receiving a plurality of network slices according to an embodiment of the present disclosure.

FIG. 2 is a block diagram illustrating a network slice hub receiving a plurality of network slices via a Radio Access Network (RAN) according to an embodiment of the present disclosure. As described herein, the network interface device of the network slice hub 200 in an embodiment may receive one or more network slices, each comprising a separate slice of the spectrum of radio communications available via a wireless signal service provider (e.g., AT&T® Mobility of Atlanta, Georgia, United States; SPRINT® Corporation of Overland Park, Kansas, United States; VERIZON® Wireless of New York, New York, United States; etc.). Such service providers may provide a 5G core network system 210 that includes any combination of physical or virtual components that are configured to provide 5G wireless communications. The core network system 210 in an embodiment may include server devices, switch devices, storage devices, or other core network system components required to operate a 5G core network system. However, while illustrated and discussed as physical or virtual components that provide 5G wireless communications, one of skill in the art in possession of the present disclosure will recognize that other components or component configuration may be utilized in a core network system to provide other wireless communications capabilities (e.g., 4G wireless communications) while remaining within the scope of the present disclosure as well.

The core network system 210 in an embodiment may have access to, or be capable of transmitting and receiving wireless signals within, a plurality of portions of the radio frequency spectrum. For example, the core network system 210 may have access to a first spectrum portion 211, a second spectrum portion 212, and a third spectrum portion 213. These spectrum portions 211, 212, and 213 may be separate from one another, and may not overlap in an embodiment. For example, spectrum portion 211 in an embodiment may include the 5G mm-wave communication network spectrum (e.g., above 6 GHz, or between 24 GHz and 52 GHz). This spectrum portion may provide peak data rates in comparison to other portions of the spectrum with extremely low latency, but limited coverage (e.g., distance from the base station). As another example, spectrum portion 212 in an embodiment may include the mid-band (e.g., below 6 GHz and above 1 GHz), which may provide higher bandwidth (up to 1 Gbps) than the low-band spectrum, and lower latency. In still another example, spectrum portion 213 in an embodiment may include the low-band (e.g., below 1 GHz) currently available in LTE technology. The low-band spectrum portion (e.g., 213) may provide lower bandwidth, but greater coverage than either the mid-band or mm-wave spectrum portions (e.g., 211, or 212, respectively).

The core network system 210 in an embodiment may enable the multiplexing of virtualized and independent logical networks. This form of virtual network architecture combines principles behind software defined networking (SDN) and network functions virtualization (NFV) on a fixed network to increase flexibility. Network slicing may separate a control plane (CP) from the user plane to move the functionality of the user plane towards an edge of the network. Each network slice formed and managed by the core network system 210 in an embodiment may have its own architecture, provisioning management and security that supports a particular purpose associated with the purpose of the formation of the network slice. Considerations such as speed, capacity, connectivity, and coverage are allocated to meet the requirements of the network slice's objectives. In examples where the connection has low latency and adequate bandwidth, the prioritization of different tasks may be performed on a software level division of the network. The network slices that occupy a single physical network may be separated such that traffic and/or security breaches from one network slice does not interfere with another network slice formed and managed by the core network system 210. In an embodiment, each network slice formed and managed by the core network system 210 may be isolated within the network and may be tailored to fulfill diverse network requirements.

In an embodiment, the core network system 210 may allocate network slices from each of the available radio frequency spectrum portions, and make those network slices available to a RAN system 220. For example, the core network system 210 may allocate to the RAN system 220 a first network slice 221 from the radio spectrum portion 211, such that network slice 221 operates within the 5G mm-wave spectrum portion to provide peak data rates and extremely low latency within a limited coverage area. As another example, the core network system 210 may allocate to the RAN system 220 a second network slice 222 from the radio spectrum portion 212, such that network slice 222 operates within the mid-band spectrum portion to provide higher bandwidth and lower latency than the low-band spectrum portion comprising LTE wireless signals.

In some embodiments, the core network system 210 may allocate multiple network slices from a single available radio frequency spectrum portion. For example, the core network system 210 in an embodiment may allocate to the RAN system 220 a third network slice 223 and a fourth network slice 224 from the single radio frequency spectrum portion 213. In such an embodiment, the third network slice 223 and fourth network slice 224 may operate within the low-band frequency spectrum portion to provide the greatest coverage available, though at lower bandwidth and higher latency than other available spectrum portions. In some embodiments, the third network slice 223 and fourth network slice 224 may provide similar or identical wireless signal metrics. In other embodiments, the third network slice 223 and fourth network slice 224 may provide different functionalities or wireless signal metrics. For example, the third network slice 223 in an embodiment may comprise a private LTE network, while the fourth network slice 224 may comprise a public LTE network.

In an embodiment, the RAN system 220 may be configured to provide for wireless communications by the network slice hub 200 operating as an endpoint computing device, or by other endpoint computing devices via the network slice hub 200, utilizing network slices allocated by the 5G core network system 210. For example, the RAN system 220 may provide an orchestration layer for wireless communications between communication devices and cellular towers, allowing wireless communications to then be exchanged by a RAN controller in the RAN system 220 via a Software Defined Networking (SDN) switch device and a separate control-based interface. The separation of the SDN switch device and the control-based interface in embodiments may allow flexibility of the RAN system 220 in accommodating Network Function Virtualization (NFV) techniques utilized in 5G communications. Specific examples or components or structures comprising the RAN system 220 in an embodiment may include controllers and instructions to execute SDN switching, and NFV within plural network elements such as radio/cellular towers, base stations, antennas, core network interface devices, or any other RAN subsystems that would be apparent to one of skill in the art. In an example embodiment, the RAN system 220 may be a 5G RAN system including cellular towers.

One of skill in the art in possession of the present disclosure would recognize that the allocation of network slices by a core network system, and the making of those network slices available by the core network system 210 via a RAN system 220 may include a variety of conventional operations, and thus is not described herein. Furthermore, one of skill in the art in possession of the present disclosure will appreciate that each network slice (e.g., 221, 222, 223, or 224) may provide particular networking characteristics or networking performance metrics, including particular data transmission latency, particular data transmission throughput/bandwidth, particular data transmission reliability, other particular Quality of Service (QoS) characteristics, and/or other particular networking performance metrics that would be apparent to one of skill in the art in possession of the present disclosure.

The core network system 210, coupled with the RAN system 220 in an embodiment may allocate a plurality of network slices to a network slice hub 200. The network slice hub 200 in some embodiments may comprise an information handling system such as that described with reference to FIG. 1, or may include portions thereof. In some embodiments, the network slice hub 200 may comprise a mobile phone, tablet computing device, a laptop/notebook computing device, or any other computing device that would be apparent to one of skill in the art in possession of the present disclosure.

The network slice hub 200 in an embodiment may include the 5G network slice hub service system operating to receive a plurality of network slices, via a plurality of WWAN virtual access points (e.g., 281, 282, 283, 284, and 285), and manage the distribution of one or more of these network slices among a plurality of endpoint computing devices in communication with the network slice hub 200. The network slice hub 200 in an embodiment may request access to each of the network slices (e.g., 221, 222, 223, and 224) available at the RAN system 220. The network slice hub 200 in an embodiment may establish one or more wireless links within each network slice (e.g., 221, 222, 223, and 224), via a plurality of WWAN virtual access points (e.g., 281, 282, 283, 284, and 285). For example, the network slice hub 200 in an embodiment may establish wireless link 225 within network slice 221 via WWAN virtual access point 281, wireless link 226 within network slice 222 via WWAN virtual access point 282, wireless link 227 within network slice 223 via WWAN virtual access point 283, wireless link 228 within network slice 223 via WWAN virtual access point 284, and wireless link 229 within network slice 224 via WWAN virtual access point 285.

The WWAN virtual access points (e.g., 281, 282, 283, 284, and 285) in an embodiment may correlate to the WWAN virtual access point 180 described with reference to FIG. 1, and the network slice hub 200 may correlate to the information handling system 100 described therein. For example, the network slice hub 200 may include an SDN controller operating in a control plane layer (e.g., via software), in part, to route incoming packets/frames to a network interface device for transmission in a specific network slice. This software-driven routing of data frames for receipt and transmission only within the specified network slice effectively narrows the radio frequency spectrum for which the WWAN interface device of the network slice hub 200 may act as an access point for any one of a plurality of endpoint computing devices, to a sub-portion of the available spectrum, or a specific network slice. Because this narrowing is achieved through network virtualization (e.g., software-driven in the control plane via the SDN controller of the network slice hub 200), this process of narrowing the range of radio frequency spectrum to a specific network slice assigned to an endpoint computing device or to the network slice hub 200 itself may be referred to herein as establishing a WWAN virtual access point (e.g., 281, 282, 283, 284, or 285). Such virtual separation of network slices in an embodiment may effectively allow only assigned devices (e.g., endpoint computing devices or the network slice hub 200 itself) to communicate with the RAN system 220 within discrete and separate sub-portions of the available cellular radio frequency spectrum. Because communication in one frequency sub-portion cannot interfere with communication in a second frequency sub-portion, assignment of separate network slices to each of a plurality of endpoint computing devices or to the network slice hub 200 itself may prevent cross-talk between endpoint computing devices or the network slice hub 200, providing secure communications.

The wireless links (e.g., 225, 226, 227, 228, and 229), established between the WWAN virtual access points 281, 282, 283, 284, and 285 of the network slice hub 200 and the RAN system 220 in an embodiment, may be referred to herein as RAN wireless links. For example, the network slice hub 200 may establish RAN wireless links (e.g., 225 and 227) in each of the network slices that would best service execution of the applications operating at the network slice hub 200 itself (as opposed to applications executing at the endpoint computing devices communicatively coupled thereto). The network slice hub 200 may further establish one additional RAN wireless link in one or more of the available network slices for distribution to a plurality of endpoint computing devices. For example, the network slice hub 200 may further establish RAN wireless link 226 accessing network slice 222, RAN wireless link 228 accessing network slice 223, and RAN wireless link 229 accessing network slice 224. As described in greater detail herein with respect to FIG. 4, the network slice hub 220 in an embodiment may reserve these additional RAN wireless links 226, 228, and 229 for facilitating communication between the RAN system 220 and one or more endpoint computing devices communicatively coupled to the network slice hub 200.

Each network slice allocated in such a way may have its own architecture, provisioning management and security that supports a particular purpose or device. Such a particular purpose in embodiments described herein may include provisioning of secure communications, or execution of one or more applications at each of the extended endpoint computing devices, or at the network slice hub 200, operating as an endpoint computing device. By allocating available network slices to these various extended endpoint computing devices and the network slice hub 200 in an embodiment, the 5G network slice hub service system of the network slice hub 200 may provide each endpoint computing device and the network slice hub 200 with a separate wireless signal meeting the specific performance and security requirements for that endpoint computing device or the network slice hub 200 acting as an endpoint computing device, while avoiding cross-traffic, interference, or security breaches between or among the various network slices.

The network slice hub 200 in an embodiment may be provided, for example, by the information handling system 100 discussed above with reference to FIG. 1 or may provide some or all of the components of the information handling system 100. In specific examples, the network slice hub 200 may comprise a mobile phone, a tablet computing device, a laptop/notebook computing device, an IoT computing device, or any other mobile computing device that would be apparent to one of skill in the art in possession of the present disclosure. As such, the network slice hub 200 may execute code instructions of the 5G network slice hub service system to facilitate communications between a communicatively coupled endpoint computing device and a 5G network RAN system 220, via plural radio systems of a network interface device, while simultaneously executing applications (e.g., e-mail applications, word processing applications, media applications, etc.) specific to the operation of the network slice hub 200 itself. Furthermore, while illustrated and discussed as a network slice hub 200 in an embodiment, one of skill in the art in possession of the present disclosure will recognize that the functionality of the network slice hub 200 discussed below may be provided by other devices that are configured to operate similarly as the network slice hub 200 discussed below.

Figure 4:
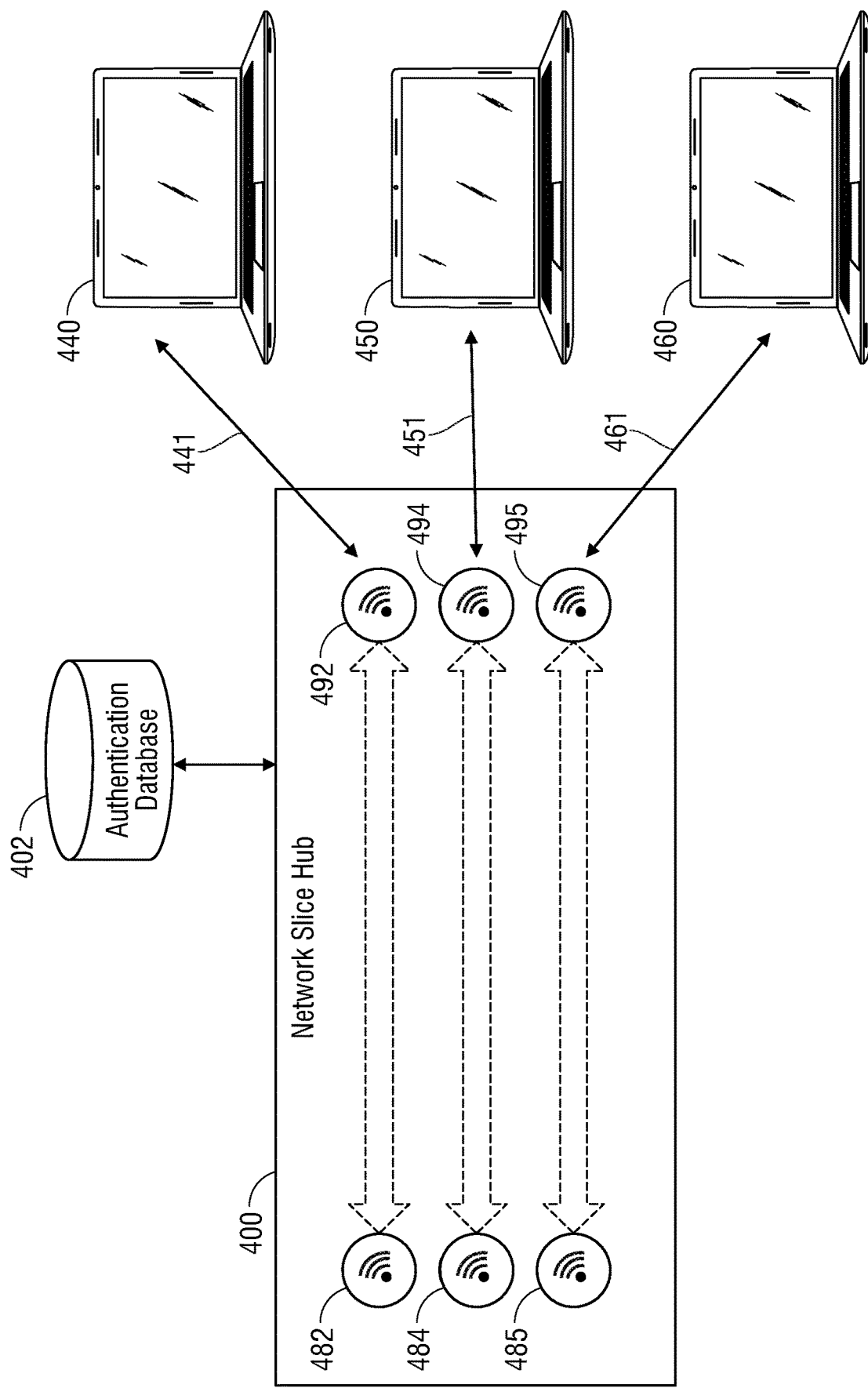
FIG. 4 is a block diagram illustrating an endpoint computing device communicatively coupled to a virtual access point transceiving in a network slice according to an embodiment of the present disclosure.

The network slice hub 200 in an embodiment may operate as a hub or tunnel to establish a network connection between the RAN system 220 and one or more communicatively coupled endpoint computing devices, as described in greater detail with respect to FIG. 4. For example, the network slice hub may establish a RAN wireless connection 226 to a WWAN virtual access point 282, assigned to facilitate wireless connectivity within the second network slice 222, between the RAN system 220 and a first endpoint computing device communicatively coupled to the network slice hub 200. As another example, the network slice hub may establish a RAN wireless connection 228 to a WWAN virtual access point 284, assigned to facilitate wireless connectivity within the third network slice 223, between the RAN system 220 and a second endpoint computing device communicatively coupled to the network slice hub 200. In yet another example, the network slice hub may establish a RAN wireless connection 229 to a WWAN virtual access point 285, assigned to facilitate wireless connectivity within the fourth network slice 224, between the RAN system 220 and a third endpoint computing device communicatively coupled to the network slice hub 200. Other RAN wireless connections (e.g., 225 and 227) may be reserved for applications operating on the network slice hub 200 in example embodiments.

In still other aspects of an embodiment, the network slice hub 200 may establish a plurality of RAN wireless connections within a single network slice available via the RAN system 220. For example, the network slice hub 200 may establish RAN wireless connection 227 and RAN wireless connection 228, both accessing the third network slice 223 in an embodiment. The network slice hub 200 may do so, in an embodiment, for example, in order to provide access to the third network slice 223 by a second endpoint computing device and by one or more applications running on the network slice hub 200. For example, the network slice hub 200 may allocate the RAN wireless connection 227 to support applications running on the network slice hub 200, and may allocate the RAN wireless connection 228 to support applications running on a second endpoint computing device communicatively coupled to the network slice hub 200.

As described herein, by allocating the available network slices 221, 222, 223, or 224 between or among the network slice hub 200 and each of the various endpoint computing devices in an embodiment, the 5G network slice hub service system operating on the network slice hub 200 may provide each extended endpoint computing device with a separate wireless signal meeting the specific performance requirements for that extended endpoint computing device, while avoiding cross-traffic, interference, or security breaches between or among the various network slices and assigned endpoint computing devices or the network slice hub 200. This allows network slice hub 200 to provide extended access to its unused or excess wireless bandwidth, such as broadband 5G bandwidth or other wireless bandwidth for extended endpoint devices that may not otherwise have such wireless bandwidth capabilities. Moreover, the systems of the present embodiments may limit the shared, extended bandwidth to selected endpoint computing devices in some embodiments of the present disclosure, and not provide public sharing such as with a hot spot. Limitations of access may be available with restriction on authentication and connectivity controls and isolation among network slices as controlled by the network slice hub 200.

Figure 3:
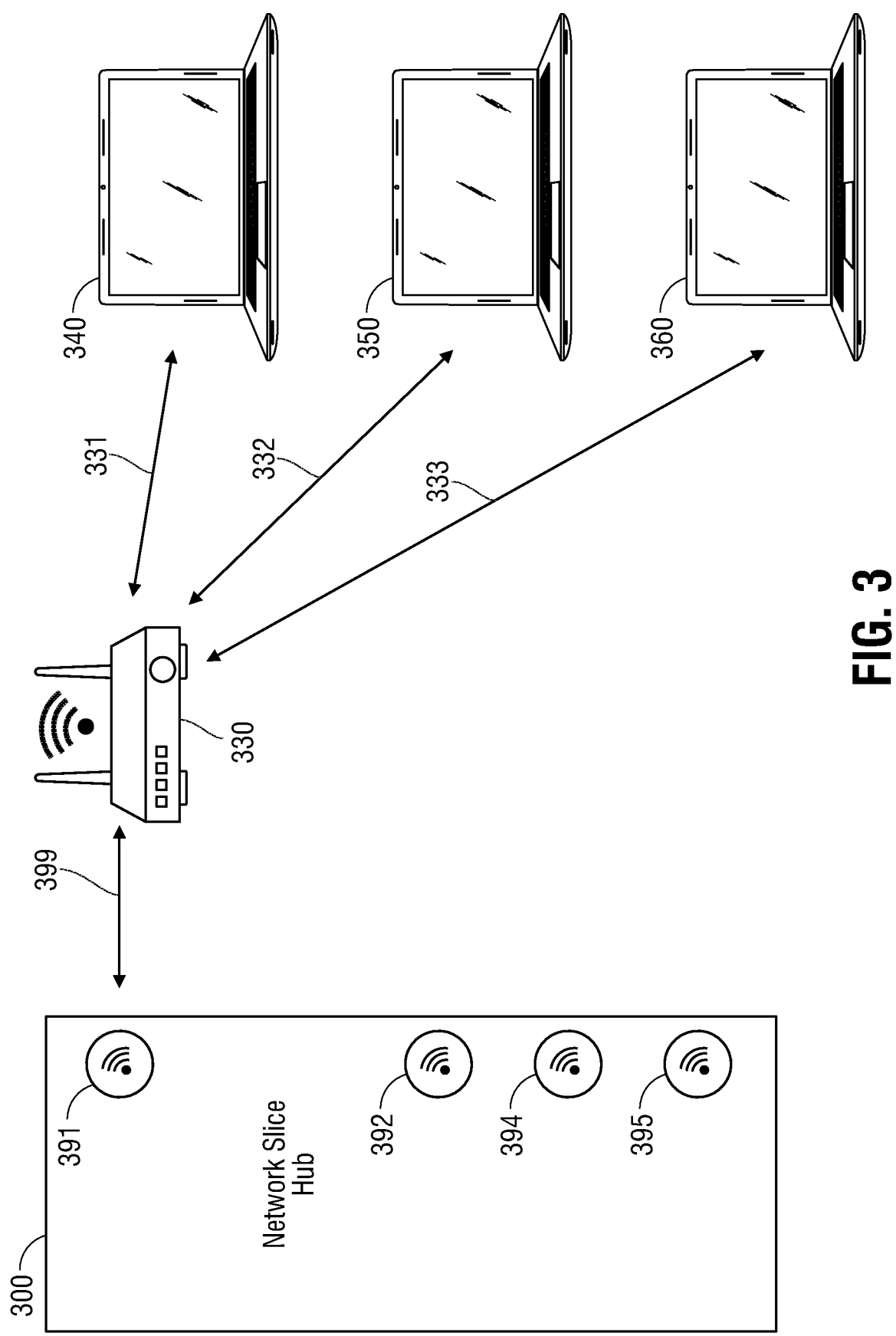
FIG. 3 is a block diagram illustrating the network slice hub establishing a plurality of virtual access points according to an embodiment of the present disclosure.

FIG. 3 is a block diagram illustrating the network slice hub 300 establishing a plurality of virtual access points for wireless communication with a plurality of endpoint computing devices according to an embodiment of the present disclosure. As described herein, the network slice hub 300 in an embodiment may manage distribution of one or more network slices of a 5G network among a plurality of endpoint computing devices in communication with the network slice hub 300 via a plurality of WLAN virtual access points such as 392, 394, and 394. Upon establishing communication with a RAN system within a plurality of network slices, as described with respect to FIG. 2, the network slice hub 300 in an embodiment may advertise the availability of these network slices to one or more endpoint computing devices. This advertisement may be selective and limited to particular selected endpoint computing devices, with specific Service Set Identifiers (SSIDs) to limit access to the extended 5G or other wireless bandwidth of network slice hub 300. Such selection may be made via a host Graphical User Interface (GUI) available to a host user operating the network slice hub 300 in one example embodiment. For example, the network slice hub 300 in an embodiment may establish an initializing WLAN virtual access point 391 for communication, via wireless link 399, with a local router 330 accessible by both the network slice hub 300 and each of a plurality of endpoint computing devices 340, 350, and 360. Wireless link 399 in an embodiment may operate in any radio frequency band associated with the WLAN standards (e.g., 2.4 GHz, 5 GHz, 60 GHz).

The 5G network slice hub service system of the network slice hub 300 may transmit the capabilities and identification of available network slices to the local router 330 via wireless link 399 in an embodiment, for transmission to a select group of endpoint computing devices (e.g., 340, 350, or 360). Other endpoint computing devices may not receive such advertised capabilities if not selected in some embodiments. For example, in an embodiment described with respect to FIG. 2 in which the network slice hub 200 has reserved the first network slice 221 for communication via RAN wireless link 225 between only the network slice hub 200 and the RAN system 220, the network slice hub 200 may transmit the capabilities and identification of network slices 222, 223, and 224. The initializing virtual access point 391 in such an embodiment may then transmit to the local router 330 the capabilities and identification of these available network slices via a wireless link 399. Such capabilities may describe, for example, which sub-portion of the available WWAN radio frequency spectrum in which each network slice is operating. For example, the network slice hub 300 in an embodiment may identify network slice 224 as operating within the 5G/LTE low-band frequencies (e.g., below 1 GHz) capable of providing greater coverage to more devices located distantly from the network slice hub 300 with a relatively higher degree of latency than other frequencies. As another example, the network slice hub 300 in an embodiment may identify network slice 222 as operating within the 5G mid-band frequencies (e.g., between 1 and 6 GHz), likely to provide less latency than the LTE low-band frequencies (e.g., below 1 GHz), but within a shorter range. As another example, the network slice hub ma identify a network slice 221 as operating within the 5G high-band frequencies (e.g., above 6 GHz or in the mm-wave ranges), likely to provide high bandwidth and low latency, but limited range. In another aspect, the network slice hub 300 may further describe a degree of security associated with the network slice. For example, the network slice hub 300 may identify network slice 223 as providing a private LTE network and network slice 224 as providing a public LTE network.

The local router 330 may broadcast or advertise availability of the identified network slices and their associated capabilities to specifically identified endpoint computing devices within range of the local router. For example, the network slice hub 300 and endpoint computing devices 340, 350, and 360 in an embodiment may all be located within range of a single Wi-Fi router (e.g., within a business meeting room), where the Wi-Fi router is capable of transceiving in the 2.4 GHz band, the 5 GHz band, and the 60 GHz band. In such an example embodiment, the local router 330 may advertise the availability of the identified network slices and their associated capabilities for extending 5G or other wireless bandwidth of the network slice hub 300 in an isolated and targeted network slice via one or all of these available WLAN bands to each of the endpoint computing devices 340, 350 and 360. This may operate via the local router 330 as a discovery stage of available 5G hub service from the network slice hub 300. This 5G hub service discovery phase may be limited to select, in-range endpoint devices as selected by the host user in some embodiments.

The instructions to advertise network slice capabilities in such a way may also instruct the local router 330 to only advertise these capabilities to endpoint computing devices executing an agent of the 5G network slice hub service system in some embodiments. For example, endpoint computing devices 340, 350, and 360 may each be executing an agent or application programming interface (API) for the 5G network slice hub service system to enable negotiation with the network slice hub 300 for access to a 5G network slice meeting specific security or performance requirements for each endpoint computing device (e.g., 340, 350, and 360). In such an embodiment, the agent or API executing on each of the endpoint computing devices (e.g., 340, 350, and 360) may transmit a request to the local router 330 for such network slice capabilities, or may transmit an identification of the endpoint computing device (340, 350, and 360) that allows the local router 330 to only transmit the network slice capabilities to specifically identified endpoint computing devices (e.g., 340, 350, and 360).

Such an API or agent of the 5G network slice hub service system in an embodiment may, in some embodiments, also execute an endpoint computing device multi-network slice utilization system operating to identify one or more applications currently executing on the endpoint computing device, determine network connectivity requirements needed to optimally execute such applications, and request access to a network slice capable of meeting such network connectivity requirements. For example, such an endpoint computing device multi-network slice utilization system may determine the endpoint computing device 340 is executing an office productivity application requiring relatively intermediate bandwidth network connectivity requirement, a relatively low latency networking connectivity requirement, and a relatively low reliability network connectivity requirement. The endpoint computing device 340 in such an embodiment may determine that a network slice operating within the mid-band (e.g., between 1 GHz and 6 GHz) may meet these relatively intermediate bandwidth, relatively low latency, and relatively low reliability requirements. As another example, such an endpoint computing device multi-network slice utilization system may determine the endpoint computing device 350 is executing a transfer of sensitive documents between secure locations, requiring relatively low bandwidth network connectivity requirement, but a relatively higher reliability network connectivity requirement, and a higher security requirement. The endpoint computing device 340 in such an embodiment may determine that a network slice operating a private LTE network (e.g., below 1 GHz) may meet these bandwidth, reliability, and security requirements. In yet another example, such an endpoint computing device multi-network slice utilization system may determine the endpoint computing device 360 is executing an e-mail application, internet messaging, or a public, unsecured browser application, requiring relatively low bandwidth network connectivity requirement, but a relatively higher reliability network connectivity requirement, and a lower security requirement. The endpoint computing device 360 in such an embodiment may determine that a network slice operating a public LTE network (e.g., below 1 GHz) may meet these bandwidth, reliability, and security requirements.

One or more endpoint computing devices may select or request access via one or more of the advertised network slices in an embodiment. For example, endpoint computing device 340 may transmit a request to the local router 330 for access to a network slice operating in the mid-band frequency spectrum portion via wireless link 331. As another example, endpoint computing device 350 may transmit a request to the local router 330 for access to a private LTE network slice operating in the low-band frequency spectrum portion via wireless link 332. In yet another example, endpoint computing device 360 may transmit a request to the local router 330 for access to a public LTE network slice operating in the low-band frequency spectrum portion via wireless link 333. In some embodiments, a single endpoint computing device may request multiple network slices. The wireless links 399, 331, 332, and 333 in an embodiment may operate according to any communication protocol supported by the local router 330, such as for example, IEEE 802.11 WLAN standards, IEEE 802.15 WPAN standards, or WMAN standards.

These are only some examples of network slice requests that may be made by the endpoint computing devices 340, 350, or 360. In some embodiments, one or more of the endpoint computing devices may execute an agent application of the 5G network slice hub service system that allows the endpoint computing device to display the available network slices and their capabilities in a graphical user interface. In such embodiments, the user of the endpoint computing device may also use such a graphical user interface to select one or more of the available network slices.

In some embodiments, endpoint computing devices may request access via a plurality of network slices. Allocation of network slices to endpoint computing devices (e.g., 340, 350, or 360) via the network slice hub 300 may be performed on a first come-first serve basis in some embodiments. Thus, in some embodiments, the endpoint computing devices may rank the selection of network slices by level of preference. For example, the endpoint computing device 360 may identify a network slice operating in the mid-band portion of the spectrum as a first choice, and identify a network slice operating in the low-band portion of the spectrum as a second choice. In other embodiments, the network slice hub 300 and initializing WLAN virtual access point 391 may transmit an updated list of available network slices for rebroadcast by the local router 330 each time an available network slice is allotted or apportioned to an endpoint computing device, making that network slice unavailable for use by other endpoint computing devices.

The local router 330 may transmit the one or more requests for access via specifically identified network slices received from the endpoint computing devices (e.g., via wireless links 331, 332, or 333) to the network slice hub 300 via wireless links 399. Upon receipt of a request from an endpoint computing device to communicate in an identified network slice via the network slice hub 300, the network slice hub 300 may establish a separate WLAN virtual access point for communications with each of the requesting endpoint computing devices (e.g., 340, 350, or 360). For example, the endpoint computing device 340 may transmit a request to communicate within a mid-band network slice, and the network slice hub 300 may consequently establish a WLAN virtual access point 392 for communication between the network slice hub 300 and only endpoint computing device 340. As another example, the endpoint computing device 350 may transmit a request to communicate within a private LTE low-band network slice, and the network slice hub 300 may consequently establish a virtual access point 394 for communication between the network slice hub 300 and only endpoint computing device 350. As yet another example, the endpoint computing device 360 may transmit a request to communicate within a public LTE low-band network slice, and the network slice hub 300 may consequently establish a virtual access point 395 for communication between the network slice hub 300 and only endpoint computing device 360.

The WLAN virtual access points (e.g., 392, 394, or 395) in an embodiment may correlate to the WLAN virtual access point 190 described with reference to FIG. 1, and the network slice hub 300 may correlate to the information handling system 100 described therein. For example, the network slice hub 300 may include an SDN controller operating in a control plane layer (e.g., via software), in part, to route incoming packets/frames to a network interface device for transmission in a specific WLAN frequency band or channel. This software-driven routing of data packets for receipt and transmission only within the specified band or channel effectively narrows the radio frequency spectrum for which the WLAN interface device of the network slice hub 300 may act as an access point for any one of a plurality of endpoint computing devices (e.g., 340, 350, or 360), to a sub-portion of the available spectrum, or a specific band or channel. Because this narrowing is achieved through network virtualization (e.g., software-driven in the control plane via the SDN controller of the network slice hub 300), this process of narrowing the range of radio frequency spectrum to a specific WLAN band or channel assigned to an endpoint computing device (e.g., 340, 350, or 360) may be referred to herein as establishing a WLAN virtual access point (e.g., 392, 394, or 395).

Such virtual separation of WLAN frequency bands and channels in an embodiment may effectively allow only assigned devices (e.g., endpoint computing devices 340, 350, or 360) to communicate with the network slice hub 300 within discrete and separate sub-portions of the available WLAN radio frequency spectrum. For example, an SDN controller of the network slice hub 300 may instruct a WLAN interface device of the network slice hub 300 to communicate with endpoint computing device 340 within the 2.4 GHz band, which may be associated with WLAN virtual access point 392. As another example, an SDN controller of the network slice hub 300 may instruct a WLAN interface device of the network slice hub 300 to communicate with endpoint computing device 350 within the 5 GHz band, which may be associated with WLAN virtual access point 394. In yet another example, an SDN controller of the network slice hub 300 may instruct a WLAN interface device of the network slice hub 300 to communicate with endpoint computing device 360 within the 60 GHz band, which may be associated with WLAN virtual access point 395. Because communication in one frequency sub-portion cannot interfere with communication in a second frequency sub-portion, assignment of separate bands or channels to each of a plurality of endpoint computing devices (e.g., 340, 350, or 360) itself may prevent cross-talk between endpoint computing devices, providing secure communications.

Each of the WLAN virtual access points (e.g., 392, 394, or 395) established by the network slice hub 300 in an embodiment may be serviced by a single radio, operating within a prescribed radio frequency band, within the network slice hub 300. For example, a radio transceiving according to the IEEE 802.11-ad specification may transmit in the 2.4 GHz, 5 GHz, or 60 GHz frequency bands to service each of the WLAN virtual access points (e.g., 392, 394, or 395) in some embodiments. When establishing each of these WLAN virtual access points in an embodiment, the 5G network slice hub service system at the network slice hub 300 may assign sub-portions of these available bands to each of the WLAN virtual access points. These sub-portions may be separated from one another to avoid interference between or among them. In other embodiments, two WLAN virtual access points may be established for communication within the same band, with each WLAN virtual access point transceiving on a different channel within that band. The determination of the frequency band or channel in which each virtual access point will be established may depend, in some embodiments, on Quality of Service (QoS) metrics for signals established between the endpoint computing devices (e.g., 340, 350, or 360) and the network slice hub 300. In other words, the network slice hub 300 may establish each WLAN virtual access point (e.g., 392, 394, or 395) to transceive in the frequency band or channel having the highest signal strength, lowest latency, or highest availability, for communication with the endpoint device associated with that WLAN virtual access point.

Upon initial establishment of each of the WLAN virtual access points (e.g., 392, 394, or 395) in an embodiment and assignment of each WLAN virtual access point to one of the endpoint computing devices, the virtual access points may be capable of communication with the endpoint computing devices (e.g., 340, 350, or 360, respectively) within the frequency band or channel assigned to that virtual access point, but may not yet allow communication between the endpoint computing devices and the backend 5G communication network (e.g., including the RAN system and core network system). The network slice hub 300 may initiate an authentication procedure for each of the endpoint computing devices (e.g., 340, 350, or 360) via the virtual access points (e.g., 396, 397, and 398, respectively), prior to allowing access to the backend 5G communication network.

FIG. 4 is a block diagram illustrating a plurality of endpoint computing devices communicatively coupled, via the network slice hub 400, to a plurality of WWAN virtual access points, each apportioned to a separate network slice according to an embodiment of the present disclosure. As described herein, upon initial establishment of each of the WLAN virtual access points (e.g., 492, 494, or 495) in an embodiment and assignment of each WLAN virtual access point to one or more of the endpoint computing devices designated to use the associated network slice, the virtual access points may be capable of communication with the endpoint computing devices (e.g., 340, 350, or 360, respectively) within the frequency band or channel assigned to that WLAN virtual access point. Each endpoint computing device may establish a wireless link with the WLAN virtual access point assigned to that endpoint computing device, via the 5G network slice hub service system in an embodiment. For example, endpoint computing device 440 may establish wireless link 441 for communication within the 2.4 GHz band with WLAN virtual access point 492 in an embodiment. As another example, endpoint computing device 450 may establish wireless link 451 for communication within the 5 GHz band with WLAN virtual access point 494 in an embodiment. In yet another example, endpoint computing device 460 may establish wireless link 461 for communication within the 60 GHz band with WLAN virtual access point 495 in an embodiment. Wireless links (e.g., 441, 451, or 461) established between the network slice hub 400 and the endpoint computing devices (e.g., 440, 450, or 460) in an embodiment may be referred to herein as endpoint wireless links.

The network slice hub 400 may engage in a process to authenticate each of the endpoint computing devices (e.g., 440, 450, and 460) via their respective wireless links (e.g., 441, 451, and 461). Such an authentication process may be performed, in some embodiments, by checking credentials provided by each endpoint computing device (e.g., 440, 450, and 460) against stored credentials at an authentication database 402 with which the network slice hub 400 is in communication. For example, in one embodiment, the authentication database 402 may comprise a portion of a client solutions management (CSM) platform operating to manage security and performance profiles for each of a plurality of endpoint computing devices and for the network slice hub 400.

Each endpoint computing device registered with authenticating credentials in an embodiment may, for example, operate an API or agent of the 5G network slice hub service system, such as the endpoint computing device multi-network slice utilization system described above with reference to FIG. 3. The API or agent of the 5G network slice hub service system operating on each endpoint computing device (e.g., 440, 450, or 460) in such an embodiment may transmit authenticating credentials matching those stored at the authentication database 402 and associated with that specific endpoint computing device to the network slice hub 400. If the authenticating credentials received by the network slice hub 400 in such an embodiment match authenticating credentials stored at the authentication database 402 in such an embodiment, the endpoint computing device (e.g., 440, 450, or 460) from which the authenticating credentials were received may be considered authenticated by the network slice hub 400. If the endpoint computing device (E.g., 440, 450, or 460) fails to transmit any such authenticating credentials (e.g., if the endpoint computing device is not operating the API or agent of the 5G network slice hub service system described above), or if the authenticating credentials provided by the endpoint computing device do not match credentials stored at the authentication database 402, the network slice hub 400 may consider the endpoint computing device non-authenticated.

If the network slice hub 400 in an embodiment fails to authenticate any one of the endpoint computing devices (e.g., 440, 450, or 460) in an embodiment, the network slice hub 400 may disallow transceiving of data with that endpoint computing device via the WLAN virtual access point associated with that endpoint computing device. In other embodiments, the network slice hub 400 in such a scenario may maintain communications with the non-authenticated endpoint computing device via the WLAN virtual access point assigned to that endpoint computing device, but disallow communication between the WLAN virtual access point associated with the non-authenticated endpoint computing device and the backend RAN system. However, upon successful authentication of one or more of the endpoint computing devices (e.g., 440, 450, or 460) in an embodiment, the SDN controller within the network slice hub 400 may, for each authenticated endpoint computing device, begin routing data between the WLAN virtual access point associated with the authenticated endpoint computing device and the WWAN virtual access point associated with the network slice requested by the authenticated endpoint computing device.

Upon such an authentication of the endpoint computing device in an embodiment, the 5G network slice hub service system of the network slice hub 400 may transmit instructions to an SDN controller of the network slice hub 400, associating the authenticated endpoint computing device with an identification of the WLAN virtual access point established for communication with that endpoint computing device, and with an identification of the WWAN virtual access point established for communication within the network slice requested by that endpoint computing device. For example, the 5G network slice hub service system of the network slice hub 400 may transmit instructions to an SDN controller of the network slice hub 400, associating the endpoint computing device 440 with WLAN virtual access point 492 and WWAN virtual access point 482. As another example, the 5G network slice hub service system of the network slice hub 400 may transmit instructions to an SDN controller of the network slice hub 400, associating the endpoint computing device 450 with WLAN virtual access point 494 and WWAN virtual access point 484. In yet another example, the 5G network slice hub service system of the network slice hub 400 may transmit instructions to an SDN controller of the network slice hub 400, associating the endpoint computing device 460 with WLAN virtual access point 495 and WWAN virtual access point 485.

As also described herein, the SDN controller of the network slice hub 400 in an embodiment may operate to receive communication packets via a WLAN virtual access point assigned to a specific endpoint computing device, process those received packets into communication frames compatible with WWAN standards, and forward those processed frames to the WWAN interface device for transmission via the WWAN virtual access point that is also assigned to the specific endpoint computing device. For example, the SDN controller of the network slice hub 400 in an embodiment may receive communication packets from endpoint computing device 440 via wireless link 441 and WLAN virtual access point 492, process those packets into WWAN-compatible data frames, and forward the processed frames to WWAN virtual access point 482. As another example, the SDN controller of the network slice hub 400 in an embodiment may receive communication packets from endpoint computing device 450 via wireless link 451 and WLAN virtual access point 494, process those packets into WWAN-compatible data frames, and forward the processed frames to WWAN virtual access point 484. In yet another example, the SDN controller of the network slice hub 400 in an embodiment may receive communication packets from endpoint computing device 460 via wireless link 461 and WLAN virtual access point 495, process those packets into WWAN-compatible data frames, and forward the processed frames to WWAN virtual access point 485.

The SDN controller of the network slice hub 400 in an embodiment may also operate to receive communication frames from the RAN system via the WWAN virtual access point assigned to a specific endpoint computing device, process those received frames into communication packets compatible with WLAN standards, and forward those processed packets to the WLAN interface device for transmission via the WLAN virtual access point that is also assigned to the specific endpoint computing device. For example, the SDN controller of the network slice hub 400 in an embodiment may receive WWAN data frames from the RAN system via WWAN virtual access point 482, process those received frames into WLAN data packets, and forward the processed packets to a WLAN interface device for transmission via the WLAN virtual access point 492 to the endpoint computing device 440. As another example, the SDN controller of the network slice hub 400 in an embodiment may receive WWAN data frames from the RAN system via WWAN virtual access point 484, process those received frames into WLAN data packets, and forward the processed packets to a WLAN interface device for transmission via the WLAN virtual access point 494 to the endpoint computing device 450. In still another example, the SDN controller of the network slice hub 400 in an embodiment may receive WWAN data frames from the RAN system via WWAN virtual access point 485, process those received frames into WLAN data packets, and forward the processed packets to a WLAN interface device for transmission via the WLAN virtual access point 495 to the endpoint computing device 460.

As also described herein, each of the WWAN virtual access points (e.g., 482, 484, and 485) in an embodiment may be associated with a single network slice, or sub-portion thereof. For example, WWAN virtual access point 482 in an embodiment may correlate to WWAN virtual access point 282 described with reference to FIG. 2, established for communication only within network slice 222. As another example, WWAN virtual access point 484 in an embodiment may correlate to WWAN virtual access point 284 described with reference to FIG. 2, established for communication only within network slice 223. In yet another example, WWAN virtual access point 485 in an embodiment may correlate to WWAN virtual access point 285 described with reference to FIG. 2, established for communication only within network slice 224.

By communicatively coupling a single WLAN virtual access point in communication with a single endpoint computing device to a single WWAN virtual access point operating within a single network slice in such a way, the SDN controller may ensure that the endpoint computing device may communicate, through the network slice hub 400, with the RAN system, only within a frequency band and network slice that are both assigned to the endpoint computing device by the 5G network slice hub service system. For example, the network slice hub 400 may establish communication in the 2.4 GHz band only with the endpoint computing device 440, and may forward these communications to the backend RAN system only within the network slice (e.g., 222) associated with endpoint computing device 440, according to instructions from the 5G network slice hub service system. In such a way, the 5G network slice hub service system and SDN controller of the network slice hub 400 may provide a tunnel between the endpoint computing device 440 and the backend RAN system that cannot be accessed or experience interference from communications with any other endpoint computing device (e.g., 450, or 460). In another example, the network slice hub 400 may establish communication in the 5 GHz band only with the endpoint computing device 450, and may forward these communications to the backend RAN system only within the network slice (e.g., 223) associated with endpoint computing device 450, according to instructions from the 5G network slice hub service system. In such a way, the 5G network slice hub service system and SDN controller of the network slice hub 400 may provide a tunnel between the endpoint computing device 450 and the backend RAN system that cannot be accessed or experience interference from communications with any other endpoint computing device (e.g., 440, or 460). In still another example, the network slice hub 400 may establish communication in the 60 GHz band only with the endpoint computing device 460, and may forward these communications to the backend RAN system only within the network slice (e.g., 224) associated with endpoint computing device 460, according to instructions from the 5G network slice hub service system. In such a way, the 5G network slice hub service system and SDN controller of the network slice hub 400 may provide a tunnel between the endpoint computing device 460 and the backend RAN system that cannot be accessed or experience interference from communications with any other endpoint computing device (e.g., 440, or 450).

In still other embodiments in which an endpoint computing device has requested access to multiple network slices, the network slice hub 400 may associate the endpoint computing device requesting such multiple network slices with multiple WWAN virtual access points. In such an embodiment, the SDN controller of the network slice hub 400 may transmit a portion of the data received from the requesting endpoint computing device via the WLAN virtual access point associated with that endpoint computing device to one of the WWAN virtual access points associated with that endpoint computing device (and a first network slice) and another portion of the data so received from the endpoint computing device to another one of the WWAN virtual access points also associated with that endpoint computing device (and a second network slice).

In yet other embodiments in which an endpoint computing device has requested access to multiple network slices, the network slice hub 400 may establish more than one WLAN virtual access point for communication with the single, requesting endpoint computing device, and associate each of the WLAN virtual access points associated with the endpoint computing device to one of the WWAN virtual access points. The SDN controller of the network slice hub 400 may then route communications received at one of the WLAN virtual access points associated with that endpoint computing device to the WWAN virtual access point also associated with that WLAN virtual access point.

In such a way, the network slice hub 400 may enable each of the WWAN virtual access points 482, 484, and 485 to transceive data between the endpoint computing devices (e.g., 440, 450, and 460, respectively) assigned to those WWAN virtual access points (e.g., 482, 484, and 485, respectively), and the backend RAN system of the 5G communication network, within the network slice requested by the endpoint computing device. The network slice hub 400 may thus communicatively couple each of the endpoint computing devices to a separate network slice of the 5G communication network. By allocating available network slices to these various endpoint computing devices, the 5G network slice hub service system of the network slice hub 400 may provide each endpoint computing device with a separate wireless signal meeting the specific performance or security requirements for that endpoint computing device, while avoiding cross-traffic, interference, or security breaches between or among the various network slices.

Figure 5:
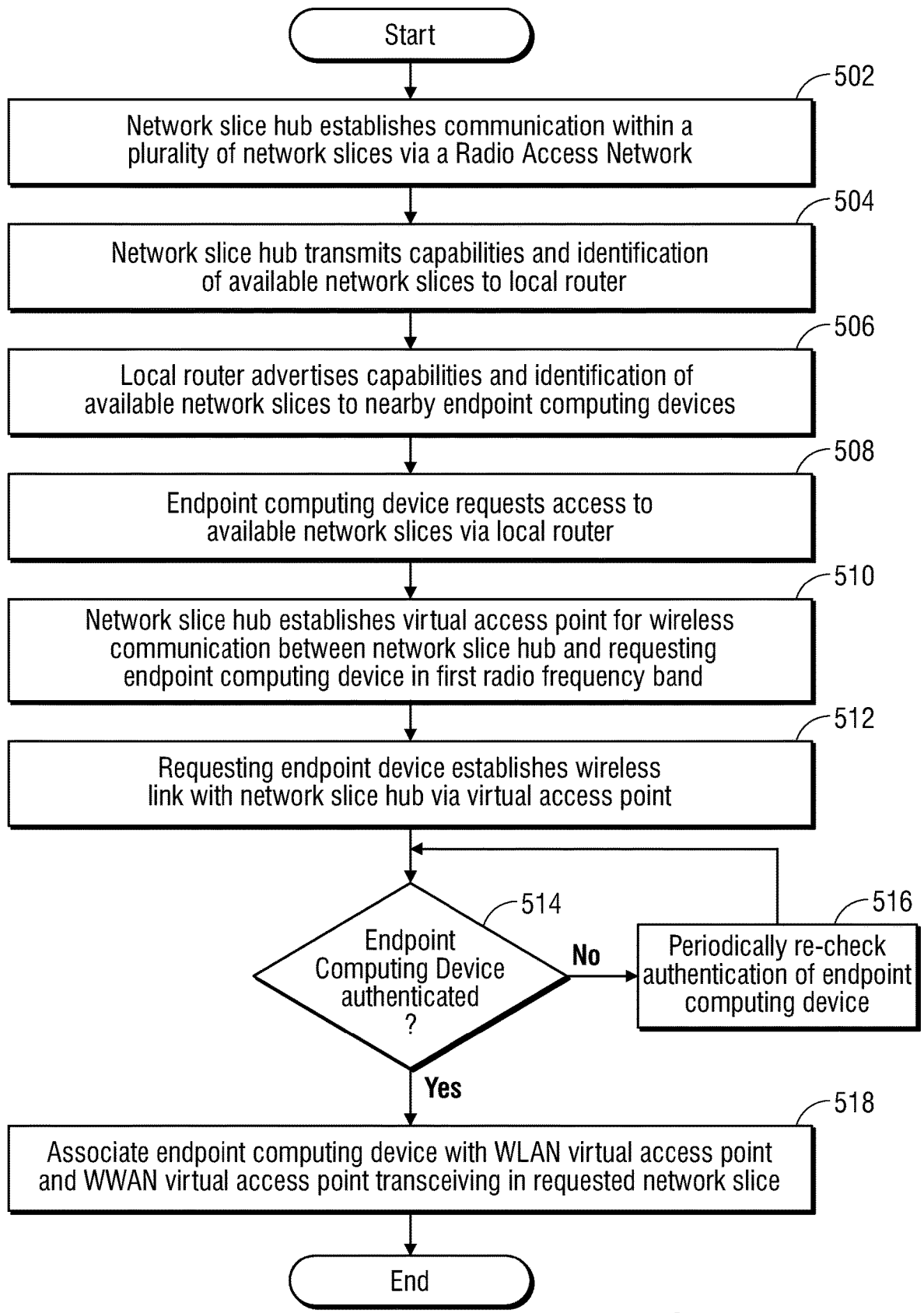
FIG. 5 is a flow diagram illustrating a method of establishing communications between an endpoint computing device and a RAN system within a network slice according to an embodiment of the present disclosure.

FIG. 5 is a flow diagram illustrating a method of establishing communications between an endpoint computing device and a RAN system, within a network slice, via virtual access points according to an embodiment of the present disclosure. As described herein, the 5G network slice hub service system in an embodiment may share 5G network slices with multiple endpoint computing devices (e.g., meeting participant devices), incapable of accessing 5G network slices themselves, by acting as a hub for the delivery of 5G network slices to one or more communicatively coupled endpoint computing devices. In such a way, the 5G network slice hub service system may provide each requesting endpoint computing device with a network slice having capabilities tailored to the needs of each endpoint computing device while avoiding cross-traffic between the endpoint computing devices.

At block 502, the network slice hub in an embodiment may establish communication within a plurality of network slices via a RAN system of a 5G communication network. For example, in an embodiment described with reference to FIG. 2, the core network system 210, coupled with the RAN system 220 in an embodiment may allocate a plurality of network slices to a network slice hub 200. The network slice hub 200 in an embodiment may request access to each of the network slices (e.g., 221, 222, 223, and 224) available at the RAN system 220, for example.

The network slice hub 200 in an embodiment may include the 5G network slice hub service system operating to receive a plurality of network slices, via a plurality of WWAN virtual access points (e.g., 281, 282, 283, 284, and 285), and manage the distribution of one or more of these network slices among a plurality of endpoint computing devices in communication with the network slice hub 200. The WWAN virtual access points (e.g., 281, 282, 283, 284, and 285) in an embodiment may be established by an SDN controller routing incoming packets/frames to a network interface device for transmission in a specific network slice. This software-driven routing of data frames for receipt and transmission only within the specified network slice effectively narrows the radio frequency spectrum for which the WWAN interface device of the network slice hub 200 may act as an access point for any one of a plurality of endpoint computing devices, to a sub-portion of the available spectrum, or a specific network slice. Such virtual separation of network slices in an embodiment may effectively allow only assigned devices (e.g., endpoint computing devices or the network slice hub 200 itself) to communicate with the RAN system 220 within discrete and separate sub-portions of the available cellular radio frequency spectrum. Because communication in one frequency sub-portion cannot interfere with communication in a second frequency sub-portion, assignment of separate network slices to each of a plurality of endpoint computing devices or to the network slice hub 200 itself may prevent cross-talk between endpoint computing devices or the network slice hub 200, providing secure communications.

The network slice hub 200 in an embodiment may request access to each of the network slices (e.g., 221, 222, 223, and 224) available at the RAN system 220. The network slice hub 200 in an embodiment may establish one or more wireless links within each network slice (e.g., 221, 222, 223, and 224), via a plurality of WWAN virtual access points (e.g., 281, 282, 283, 284, and 285). For example, the network slice hub 200 in an embodiment may establish wireless link 225 within network slice 221 via WWAN virtual access point 281, wireless link 226 within network slice 222 via WWAN virtual access point 282, wireless link 227 within network slice 223 via WWAN virtual access point 283, wireless link 228 within network slice 223 via WWAN virtual access point 284, and wireless link 229 within network slice 224 via WWAN virtual access point 285.

The network slice hub 200 may establish RAN wireless links (e.g., 225 and 227) in each of the network slices that would best service execution of the applications operating at the network slice hub 200 itself (as opposed to applications executing at the endpoint computing devices communicatively coupled thereto). The network slice hub 200 may further establish one additional RAN wireless link in one or more of the available network slices for distribution to a plurality of endpoint computing devices. For example, the network slice hub 200 may further establish RAN wireless link 226 accessing network slice 222, RAN wireless link 228 accessing network slice 223, and RAN wireless link 229 accessing network slice 224. The network slice hub 220 in an embodiment may reserve these additional RAN wireless links 226, 228, and 229 for facilitating communication between the RAN system 220 and one or more endpoint computing devices communicatively coupled to the network slice hub 200.

Assignment of a network slice to a WWAN access point in an embodiment may effectively cause that WWAN access point to transceive data only within a radio frequency sub-portion. Because communication in one frequency sub-portion cannot interfere with communication in a second frequency sub-portion, assignment of separate network slices to each of a plurality of endpoint computing devices or to the network slice hub itself may prevent cross-talk between endpoint computing devices or the network slice hub, providing secure communications and isolation among network slices.

The network slice hub may transmit capabilities and identification of available network slices to a local router in an embodiment at block 504. For example, in an embodiment described with reference to FIG. 3, upon establishing communication with a RAN system within a plurality of network slices, the network slice hub 300 may advertise the availability of these network slices to one or more endpoint computing devices. The network slice hub 300 in an embodiment may establish an initializing WLAN virtual access point 391 for communication, via wireless link 399, with a local router accessible by both the network slice hub 300 and each of a plurality of endpoint computing devices 340, 350, and 360. Wireless link 399 in an embodiment may operate in any radio frequency band associated with the WLAN standards (e.g., 2.4 GHz, 5 GHz, 60 GHz).

The 5G network slice hub service system of the network slice hub may transmit the capabilities and identification of available network slices to the local router in an embodiment. For example, in an embodiment described with respect to FIG. 2 in which the network slice hub 200 has reserved the first network slice 221 for communication via RAN wireless link 225 between only the network slice hub 200 and the RAN system 220, the network slice hub 200 may transmit the capabilities and identification of network slices 222, 223, and 224. The initializing virtual access point in such an embodiment may then transmit to the local router the capabilities and identification of these available network slices. Such capabilities may describe, for example, which sub-portion of the available WWAN radio frequency spectrum in which each network slice is operating. For example, the network slice hub in an embodiment may identify network slice 224 as operating within the 5G/LTE low-band frequencies (e.g., below 1 GHz) capable of providing greater coverage to more devices located distantly from the network slice hub with a relatively higher degree of latency than other frequencies. As another example, the network slice hub in an embodiment may identify network slice 222 as operating within the 5G mid-band frequencies (e.g., between 1 and 6 GHz), likely to provide less latency than the LTE low-band frequencies (e.g., below 1 GHz), but within a shorter range. As yet another example, the network slice hub in an embodiment may identify network slice 221 as operating within the 5G high-band frequencies or mm-wave range frequencies (e.g., above 6 GHz), likely to provide high bandwidth with low latency, but within even shorter range. In another aspect, the network slice hub may further describe a degree of security associated with the network slice. For example, the network slice hub may identify network slice 223 as providing a private LTE network and network slice 224 as providing a public LTE network.

At block 506, the local router in an embodiment may broadcast capabilities and identification of available network slices to the nearby endpoint computing devices in an embodiment. For example, the local router 330 may broadcast or advertise availability of the identified network slices and their associated capabilities to endpoint computing devices 340, 350, and 360 in an embodiment, which may all be located within range of a single Wi-Fi router 330 (e.g., within a business meeting room), capable of transceiving in the 2.4 GHz band, the 5 GHz band, and the 60 GHz band. In such an example embodiment, the local router 330 may advertise the availability of the identified network slices and their associated capabilities on one or all of these available bands to each of the endpoint computing devices 340, 350 and 360.

An endpoint computing device may request access to an available network slice via the local router at block 508 in an embodiment. For example, endpoint computing device 340 may transmit a request to the local router 330 for access to a network slice operating in the mid-band frequency spectrum portion via wireless link 331. As another example, endpoint computing device 350 may transmit a request to the local router 330 for access to a private LTE network slice operating in the low-band frequency spectrum portion via wireless link 332. In yet another example, endpoint computing device 360 may transmit a request to the local router 330 for access to a public LTE network slice operating in the low-band frequency spectrum portion via wireless link 333. In some embodiments, a single endpoint computing device may request multiple network slices.

At block 510, the network slice hub in an embodiment may establish a WLAN virtual access point for wireless communication between the network slice hub and the requesting endpoint computing device in a first radio frequency band. For example, the local router 330 may transmit the one or more requests for access via specifically identified network slices received from the endpoint computing devices (e.g., via wireless links 331, 332, or 333) to the network slice hub 300 via wireless link 399. Upon receipt of a request from an endpoint computing device to communicate in an identified network slice via the network slice hub 300, the network slice hub 300 may establish a separate WLAN virtual access point for communications with each of the requesting endpoint computing devices (e.g., 340, 350, or 360). For example, the network slice hub 300 may establish a WLAN virtual access point 392 for communication between the network slice hub 300 and only endpoint computing device 340. As another example, the network slice hub 300 may establish a WLAN virtual access point 394 for communication between the network slice hub 300 and only endpoint computing device 350. As yet another example, the network slice hub 300 may establish a WLAN virtual access point 395 for communication between the network slice hub 300 and only endpoint computing device 360. In other embodiments, multiple endpoint devices may share a virtual access point and network slice, but such a network slice may be limited to such determined endpoint devices.

The WLAN virtual access points (e.g., 392, 394, or 395) in an embodiment may be established by an SDN controller routing incoming packets/frames to a network interface device for transmission in a specific WLAN frequency band or channel. This software-driven routing of data packets for receipt and transmission only within the specified band or channel effectively narrows the radio frequency spectrum for which the WLAN interface device of the network slice hub 300 may act as an access point for any one of a plurality of endpoint computing devices (e.g., 340, 350, or 360), to a sub-portion of the available spectrum, or a specific band or channel. Such virtual separation of WLAN frequency bands and channels in an embodiment may effectively allow only assigned devices (e.g., endpoint computing devices 340, 350, or 360) to communicate with the network slice hub 300 within discrete and separate sub-portions of the available WLAN radio frequency spectrum. For example, an SDN controller of the network slice hub 300 may instruct a WLAN interface device of the network slice hub 300 to communicate with endpoint computing device 340 within the 2.4 GHz band, which may be associated with WLAN virtual access point 392. As another example, an SDN controller of the network slice hub 300 may instruct a WLAN interface device of the network slice hub 300 to communicate with endpoint computing device 350 within the 5 GHz band, which may be associated with WLAN virtual access point 394. In yet another example, an SDN controller of the network slice hub 300 may instruct a WLAN interface device of the network slice hub 300 to communicate with endpoint computing device 360 within the 60 GHz band, which may be associated with WLAN virtual access point 395. Because communication in one frequency sub-portion cannot interfere with communication in a second frequency sub-portion, assignment of separate bands or channels to each of a plurality of endpoint computing devices (e.g., 340, 350, or 360) itself may prevent cross-talk between endpoint computing devices on different network slices, providing secure communications.

The requesting endpoint device in an embodiment may establish a wireless link with the network slice hub via the virtual access point at block 512. For example, in an embodiment described with reference to FIG. 4, endpoint wireless link 441 may be established between the endpoint computing device 440 and the WLAN virtual access point 491 established to link the endpoint computing device 440 to the network slice requested by 440. As another example, endpoint wireless link 451 may be established between the endpoint computing device 450 and the WLAN virtual access point 494 established to link the endpoint computing device 450 to the network slice requested by 450. As yet another example, endpoint wireless link 461 may be established between the endpoint computing device 460 and the WLAN virtual access point 495 established to link the endpoint computing device 460 to the network slice requested by 460.

At block 514, the network slice hub may determine whether the endpoint computing device can be authenticated. For example, the network slice hub 400 may engage in a process to authenticate each of the endpoint computing devices (e.g., 440, 450, and 460) via their respective wireless links (e.g., 441, 451, and 461). Each endpoint computing device registered with authenticating credentials in an embodiment may, for example, operate an API or agent of the 5G network slice hub service system. The API or agent of the 5G network slice hub service system operating on each endpoint computing device (e.g., 440, 450, or 460) in such an embodiment may transmit authenticating credentials matching those stored at the authentication database 402 and associated with that specific endpoint computing device to the network slice hub 400. If the authenticating credentials received by the network slice hub 400 in such an embodiment match authenticating credentials stored at the authentication database 402 in such an embodiment, the endpoint computing device (e.g., 440, 450, or 460) from which the authenticating credentials were received may be considered authenticated by the network slice hub 400, and the method may proceed to block 518 to grant the authenticated endpoint computing device access to the requested network slice. If the endpoint computing device (E.g., 440, 450, or 460) fails to transmit any such authenticating credentials (e.g., if the endpoint computing device is not operating the API or agent of the 5G network slice hub service system described above), or if the authenticating credentials provided by the endpoint computing device do not match credentials stored at the authentication database 402, the network slice hub 400 may consider the endpoint computing device non-authenticated, and the method may proceed to block 516 for periodic re-check of authentication credentials.

The network slice hub may periodically re-check authentication of the endpoint computing device at block 516 in an embodiment in which the endpoint computing device cannot be authenticated. For example, if the authentication database in an embodiment is operated by a CSM platform, the CSM platform may be in routine contact with the endpoint computing device such that the CSM platform may update authentication credentials stored at the authentication database to match those stored at the endpoint computing device, or vice versa. Upon such an updating process, the endpoint computing device may be prompted to re-transmit such updated or matching authentication credentials to the network slice hub. The method may then proceed back to block 514, where the network slice hub may then re-check the authentication database to ensure the newly updated credentials stored there match those received most recently from the endpoint computing device.

In another example embodiment, the network slice hub may terminate the wireless link between the endpoint device and the network slice hub in an embodiment in which the endpoint computing device cannot be authenticated. For example, in an embodiment in which the network slice hub 400 fails to authenticate endpoint computing device 440, the network slice hub 400 may terminate wireless link 441, without granting endpoint computing device 440 access to the RAN wireless link associated with the network slice requested by the endpoint computing device 440. The method for establishing communication with the unauthenticated endpoint computing device may then end.

For example, in an embodiment in which the network slice hub 400 fails to authenticate endpoint computing device 440, the network slice hub 400 may terminate wireless link 441, without granting endpoint computing device 440 access to the RAN wireless link associated with the network slice requested by the endpoint computing device 440. The method for establishing communication with the unauthenticated endpoint computing device may then end.

In some embodiments, if the authentication fails, the network slice hub 400 in such a scenario may maintain communications with the non-authenticated endpoint computing device via the WLAN virtual access point assigned to that endpoint computing device, but disallow communication between the WLAN virtual access point associated with the non-authenticated endpoint computing device and the backend RAN system. However, upon successful authentication of one or more of the endpoint computing devices (e.g., 440, 450, or 460) in an embodiment, the SDN controller within the network slice hub 400 may, for each authenticated endpoint computing device, begin routing data between the WLAN virtual access point associated with the authenticated endpoint computing device and the WWAN virtual access point associated with the network slice requested by the authenticated endpoint computing device.

At block 518, the network slice hub in an embodiment in which the endpoint computing device has been authenticated may associate the authenticated endpoint computing device with an identification of the WLAN virtual access point established for communication with that endpoint computing device, and with an identification of the WWAN virtual access point established for communication within the network slice requested by that endpoint computing device. For example, the 5G network slice hub service system of the network slice hub 400 may transmit instructions to an SDN controller of the network slice hub 400, associating the endpoint computing device 440 with WLAN virtual access point 492 and WWAN virtual access point 482. As another example, the 5G network slice hub service system of the network slice hub 400 may transmit instructions to an SDN controller of the network slice hub 400, associating the endpoint computing device 450 with WLAN virtual access point 494 and WWAN virtual access point 484. In yet another example, the 5G network slice hub service system of the network slice hub 400 may transmit instructions to an SDN controller of the network slice hub 400, associating the endpoint computing device 460 with WLAN virtual access point 495 and WWAN virtual access point 485.

Figure 6:
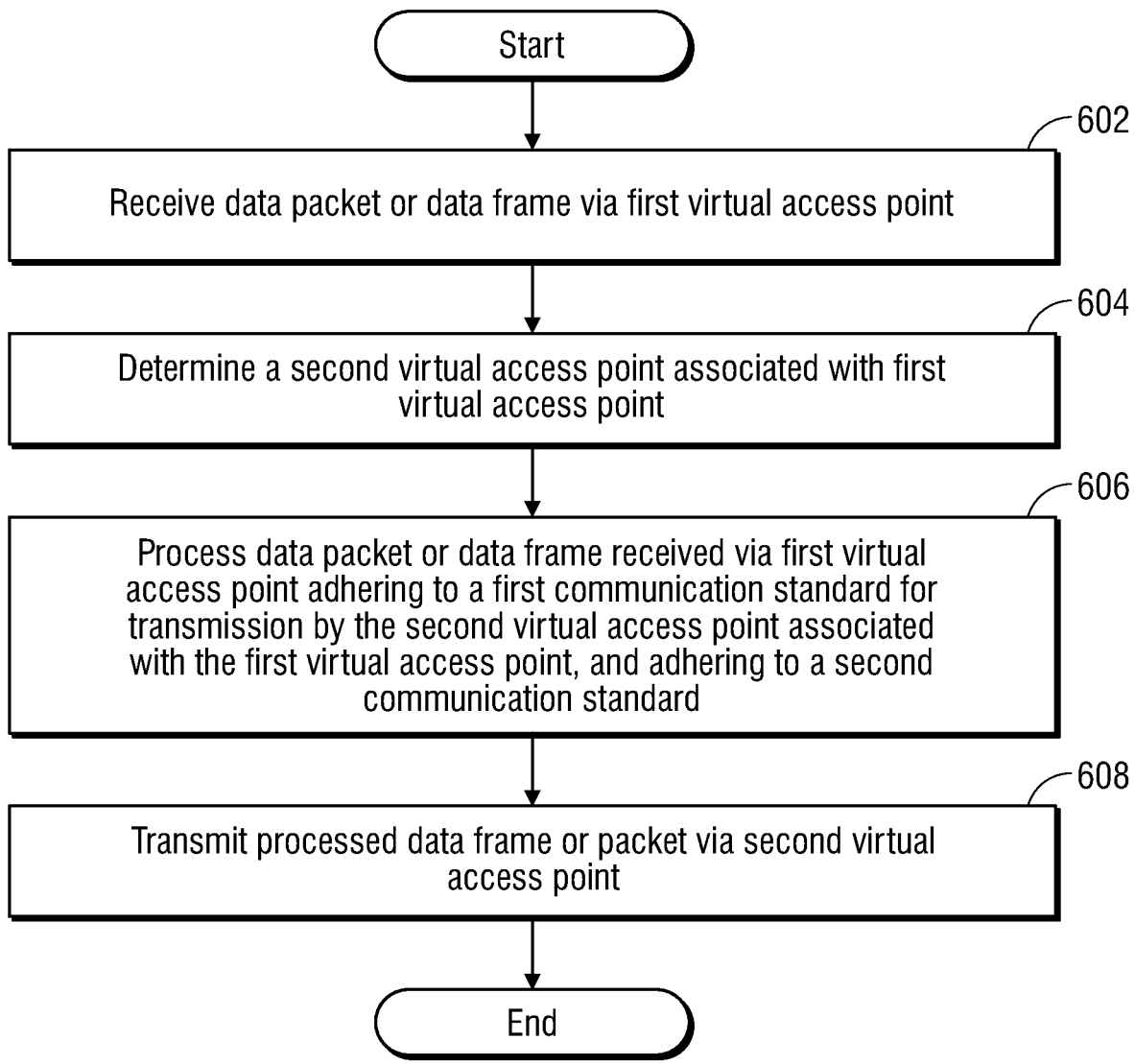
FIG. 6 is a flow diagram illustrating a method of processing a signal received from a virtual access point for transmission to a 5G network according to an embodiment of the present disclosure.

As described in greater detail herein with respect to FIGS. 4 and 6, the SDN controller of the network slice hub in an embodiment may operate to receive communication packets via a WLAN virtual access point assigned to at least one specific endpoint computing device, process those received packets into communication frames compatible with WWAN standards, and forward those processed frames to the WWAN interface device for transmission via the WWAN virtual access point that is also assigned to the specific endpoint computing device. The SDN controller of the network slice hub in an embodiment may also operate to receive communication frames from the RAN system via the WWAN virtual access point assigned to a specific endpoint computing device, process those received frames into communication packets compatible with WLAN standards, and forward those processed packets to the WLAN interface device for transmission via the WLAN virtual access point that is also assigned to the specific endpoint computing device.

Each of the WWAN virtual access points (e.g., 482, 484, and 485) in an embodiment may be associated with a single network slice, or sub-portion thereof. For example, WWAN virtual access point 482 in an embodiment may correlate to WWAN virtual access point 282 described with reference to FIG. 2, established for communication only within network slice 222. As another example, WWAN virtual access point 484 in an embodiment may correlate to WWAN virtual access point 284 described with reference to FIG. 2, established for communication only within network slice 223. In yet another example, WWAN virtual access point 485 in an embodiment may correlate to WWAN virtual access point 285 described with reference to FIG. 2, established for communication only within network slice 224. The method for allocating a specific network slice to a requesting endpoint computing device may then end.

Each network slice allocated in such a way may have its own architecture, provisioning management and security that supports a particular purpose or device. Such a particular purpose in embodiments described herein may include provisioning of secure communications, or execution of one or more applications at each of the endpoint computing devices, or at the network slice hub. By allocating available network slices to these various endpoint computing devices and the network slice hub in an embodiment, the 5G network slice hub service system of the network slice hub may provide each endpoint computing device and the network slice hub with a separate wireless signal meeting the specific performance and security requirements for that endpoint computing device, while avoiding cross-traffic, interference, or security breaches between or among the various network slices.

FIG. 6 is a flow diagram illustrating a method of processing a signal received from a virtual access point associated with an apportioned network slice for communication in a 5G network within the apportioned network slice according to an embodiment of the present disclosure. As described herein, the SDN controller of the network slice hub in an embodiment may operate to receive communication packets via a WLAN virtual access point assigned to a specific endpoint computing device, process those received packets into communication frames compatible with WWAN standards, and forward those processed frames to the WWAN interface device for transmission via the WWAN virtual access point that is also assigned to the specific endpoint computing device. The SDN controller of the network slice hub in an embodiment may also operate to receive communication frames from the RAN system via the WWAN virtual access point assigned to a specific endpoint computing device, process those received frames into communication packets compatible with WLAN standards, and forward those processed packets to the WLAN interface device for transmission via the WLAN virtual access point that is also assigned to the specific endpoint computing device or assigned to plural, specific endpoint devices.

At block 602, the SDN controller of the network slice hub in an embodiment may receive data packets or data frames via a first virtual access point. The SDN controller of the network slice hub in an embodiment may operate, for example, to receive communication packets via a first virtual access point adhering to the WLAN communication standards. For example, in an embodiment described with reference to FIG. 4, the SDN controller of the network slice hub 400 may receive data packets adhering to the WLAN communications standard from the endpoint computing device 440 via WLAN virtual access point 492. As another example, the SDN controller of the network slice hub 400 may receive data packets adhering to the WLAN communications standard from the endpoint computing device 450 via WLAN virtual access point 494. In yet another example, the SDN controller of the network slice hub 400 may receive data packets adhering to the WLAN communications standard from the endpoint computing device 460 via WLAN virtual access point 495.

In another embodiment, the SDN controller of the network slice hub in an embodiment may operate, for example, to receive communication frames via a first virtual access point adhering to the WWAN communication standards. For example, in an embodiment described with reference to FIG. 2, the SDN controller of the network slice hub 200 may receive data packets adhering to the WWAN communications standard from the backend RAN system 220, within network slice 222 via WWAN virtual access point 282. As another example, the SDN controller of the network slice hub 200 may receive data packets adhering to the WWAN communications standard from the backend RAN system 220, within network slice 223 via WWAN virtual access point 284. In yet another example, the SDN controller of the network slice hub 200 may receive data packets adhering to the WWAN communications standard from the backend RAN system 220, within network slice 224 via WWAN virtual access point 285.

The network slice hub in an embodiment may determine the network slice associated with the first virtual access point at block 604. As described herein with respect to FIG. 5 at block 518, the 5G network slice hub service system in an embodiment may associate the endpoint computing device with both the WLAN virtual access point through which the endpoint computing device and network slice hub are communicatively linked, and the WWAN virtual access point transceiving within the network slice requested by the endpoint computing device.

The SDN controller in an embodiment, upon receiving data packets from the endpoint computing device via a first virtual access point adhering to the WWAN communications standard, identifies or determines the second virtual access point operating as the WLAN virtual access point, based on instructions received from the 5G network slice hub service system, as described directly above. For example, the SDN controller receiving data packets via the WLAN virtual access point 492 in an embodiment determines the WLAN virtual access point 492 is associated with the WWAN virtual access point 482 providing a tunnel between the virtual access points. As another example, the SDN controller receiving data packets via the WLAN virtual access point 494 in an embodiment determines the WLAN virtual access point 494 is associated with the WWAN virtual access point 484 providing a tunnel between those virtual access points. In yet another example, the SDN controller receiving data packets via the WLAN virtual access point 495 in an embodiment determines the WLAN virtual access point 495 is associated with the WWAN virtual access point 485 providing a tunnel between the virtual access points.

In another aspect of an embodiment, the SDN controller, upon receiving data frames from the backend RAN system via a first virtual access point adhering to the WWAN communications standard, has identified or determined the second virtual access point associated with the WWAN virtual access point, based on instructions received from the 5G network slice hub service system, as described directly above. For example, the SDN controller receiving data frames via the WWAN virtual access point 482 in an embodiment determines the WWAN virtual access point 482 is associated with the WLAN virtual access point 492 providing a tunnel between the virtual access points. As another example, the SDN controller receiving data frames via the WWAN virtual access point 484 in an embodiment determines the WWAN virtual access point 484 is associated with the WLAN virtual access point 494 providing a tunnel between those virtual access points. In yet another example, the SDN controller receiving data frames via the WWAN virtual access point 495 in an embodiment determines the WWAN virtual access point 485 is associated with the WLAN virtual access point 495 providing a tunnel between the virtual access points.

At block 606, the SDN controller of the network slice hub in an embodiment may process data packets or data frames received via the first virtual access point adhering to a first communication standard for transmission by the second virtual access point associated with the first virtual access point, and adhering to a second communication standard. For example, the SDN controller in an embodiment may process data packets received via the WLAN virtual access point 492 into data frames for transmission by the WWAN virtual access point 482. As another example, the SDN controller in an embodiment may process data packets received via the WLAN virtual access point 494 into data frames for transmission by the WWAN virtual access point 484. In yet another example, the SDN controller in an embodiment may process data packets received via the WLAN virtual access point 495 into data frames for transmission by the WWAN virtual access point 485.

In another aspect of an embodiment, the SDN may process data frames received via a WWAN virtual access point into WLAN-compliant data packets for transmission via a WLAN access point associated with the receiving WWAN virtual access point. For example, the SDN controller in an embodiment may process data frames received via the WWAN virtual access point 482 into data packets for transmission by the WLAN virtual access point 492. As another example, the SDN controller in an embodiment may process data frames received via the WWAN virtual access point 484 into data packets for transmission by the WLAN virtual access point 494. In yet another example, the SDN controller in an embodiment may process data frames received via the WWAN virtual access point 485 into data packets for transmission by the WLAN virtual access point 495.

The SDN controller in the network slice hub in an embodiment may receive data packets via a WLAN virtual access point comprising a data payload or packet frame, encapsulated by various headers, addresses, or instructions. For example, a WLAN data packet may begin with a frame control instruction, and a duration/connection instruction. These instructions may be followed by a plurality of headers containing addresses, including a MAC address for the receiving WLAN virtual access point, a MAC address of the endpoint computing device that transmitted the packet, and a MAC address for the final destination of the packet, which may be reached via the 5G cellular network. The remainder of the WLAN data packet may comprise the data payload the final destination computing device will process, as well as a 32 bit cyclic redundancy check. The SDN controller in an embodiment, upon receiving such a WLAN data packet, may strip the frame control and duration/connection instructions, any headers containing addresses, and the cyclic redundancy check from the data payload, and store the payload in memory accessible by the SDN controller.

The SDN controller in an embodiment may also receive data frames via a WWAN virtual access point comprising an Internet Protocol (IP) payload, included within a Media Access Control (MAC) layer transport block, and preceded by several headers. Similar to the WLAN data packet payload, the IP payload may comprise the data that the final destination computing device will process. An example MAC transport block in an embodiment may include multiple IP payloads, with each payload preceded by a Radio Link Control (RLC) layer header, a Packet Data Convergence Protocol (PDCP) layer header, and a Service Data Adaptation Protocol (SDAP) layer header. The IP payload in an embodiment may be combined with an SDAP header to form an SDAP service data unit (SDU). The SDAP header in an embodiment may provide mapping between QoS available via the backend RAN in various network slices and QoS requirements of the endpoint computing device requesting access to such network slices. A PDCP header providing compression instructions for other headers may be appended to the SDAP SDU to form a PDCP SDU. An RLC header providing error correction and instructions on how to deconstruct the PDCP SDU into two separate RLC SDUs or how to reconstruct two separate RLC SDUs into a single PDCP SDU may be appended to the PDCP SDU to form an RLC SDU. Finally, a MAC header mapping between logical channels and transport channels, or providing instructions on multiplexing or demultiplexing of a plurality of RLC SDUs into or from MAC transport blocks may be appended to the RLC SDU, which may be combined with other RLC SDUs to form a single MAC transport block.

In order to process data packets received via a WLAN virtual access point for transmission via a WWAN virtual access point, the SDN controller in an embodiment may first strip the frame control and duration/connection instructions, any headers containing addresses, and the cyclic redundancy check from the data payload or frame body of the received WLAN packet, and store the payload/frame body in memory accessible by the SDN controller. The SDN controller may then treat the payload/frame body stored in memory as an IP payload, and append an SDAP header, a PDCP header, an RLC header, and a MAC header to form a MAC Protocol Data Unit (PDU) containing the data payload. The MAC PDU may be multiplexed with other MAC PDUs to form a MAC transport block which may then be inserted into a WWAN-compliant data frame.

The SDN controller may create data frames having a structure defined by existing 4G or LTE technology, or by the emerging 5G standard. Each network slice in an embodiment may have varying capabilities, such as capabilities associated with the existing LTE standards, or capabilities unique to the emerging 5G standard or "New Radio" (NR). The emerging 5G standard, for example, may allow transmission of frames in mini-slots, which are shorter in duration than the slots defined by the LTE standard, in support of ultra-reliable, low latency communications (URLLC). In order to enable 5G NR specific capabilities, the SDN controller in an embodiment may generate WWAN-compliant frames, including headings, buffers, or compression instructions for allocating the MAC transport block that includes the data payload to one or more resource blocks for transmission within a slot, mini-slot, sub-frame, or frame via a WWAN virtual access point.

In some embodiments, a WLAN data packet payload may include one or more of the SDAP header, a PDCP header, an RLC header, or the MAC header, such that the WLAN data packet payload itself comprises a MAC transport block or a portion thereof, ready for packaging within a WWAN-compliant data frame. In such an embodiment, the endpoint computing device may generate the MAC transport block, append the frame control and duration/connection instructions, any headers containing addresses required for WLAN communication, and the cyclic redundancy check to the MAC transport block to form a WLAN-compliant data packet. Upon receipt of this WLAN-compliant data packet in such an embodiment, the SDN controller may strip the frame control and duration/connection instructions, any headers containing addresses, and the cyclic redundancy check from the data payload to isolate the MAC transport block comprising that WLAN data packet payload. In such an embodiment, the SDN controller may not need to append an SDAP header, PDCP header, RLC header, or MAC header to the IP payload within the MAC transport block, because the MAC transport block encapsulated within the WLAN data packet already contains this information. The SDN controller may then generate WWAN-compliant frames, including headings, buffers, or compression instructions for allocating the MAC transport block that includes the IP payload to one or more resource blocks for transmission within a slot, mini-slot, sub-frame, or frame via a WWAN virtual access point.

In order to process data frames received via a WWAN virtual access point for transmission via a WLAN virtual access point, the SDN controller in an embodiment may isolate a resource block containing a MAC transport block, and demultiplex the MAC transport block into an RLC SDU, based on instructions within the MAC header appended to the RLC SDU. In an embodiment in which the RLC header indicates a single payload has been allocated across two separate PDCP SDUs, the SDN controller in an embodiment may combine the separate PDCP SDUs based on the RLC header instructions to reconstruct the payload. The SDN controller may strip the RLC header, the PDCP header, and the SDAP header to isolate an IP payload, and store the IP payload to memory. The SDN controller in an embodiment may then append frame control and duration/connection instructions, any headers containing addresses, and a required cyclic redundancy check to the stored IP payload to form a WLAN-compliant data packet.

The network interface device of the network slice hub in an embodiment may transmit the processed data frame or packet via the second virtual access point at block 608. Upon processing the data frames or packets into the proper format for transmission in an embodiment, the SDN controller may route the processed packet to the proper network interface device for transmission. For example, in an embodiment described with reference to FIG. 4, upon processing a WLAN data packet received via WLAN virtual access point 492 into a WWAN-compliant data frame, the SDN controller of the network slice hub 400 may forward the processed WWAN-compliant data frame to the WWAN virtual access point 482 for transmission within the network slice associated with the WWAN virtual access point 482. As another example, upon processing a WLAN data packet received via WLAN virtual access point 494 into a WWAN-compliant data frame, the SDN controller of the network slice hub 400 may forward the processed WWAN-compliant data frame to the WWAN virtual access point 484 for transmission within the network slice associated with the WWAN virtual access point 484. As yet another example, upon processing a WLAN data packet received via WLAN virtual access point 495 into a WWAN-compliant data frame, the SDN controller of the network slice hub 400 may forward the processed WWAN-compliant data frame to the WWAN virtual access point 485 for transmission within the network slice associated with the WWAN virtual access point 485.

The WLAN data packet received at WLAN virtual access point in such an embodiment may be received within a portion of the available WLAN radio frequency spectrum on which only one endpoint computing device may transceive data with the network slice hub. For example, in an embodiment, the 5G network slice hub service system may instruct the SDN controller to associate the endpoint computing device 440 with the 2.4 GHz portion of the available WLAN radio frequency spectrum. In such an embodiment, the SDN controller may identify all WLAN data packets received at the network slice hub 400 within the 2.4 GHz WLAN radio frequency band as data packets received via WLAN virtual access point 492. As another example, in an embodiment, the 5G network slice hub service system may instruct the SDN controller to associate the endpoint computing device 450 with the 5 GHz portion of the available WLAN radio frequency spectrum. In such an embodiment, the SDN controller may identify all WLAN data packets received at the network slice hub 400 within the 5 GHz WLAN radio frequency band as data packets received via WLAN virtual access point 494. In yet another example, in an embodiment, the 5G network slice hub service system may instruct the SDN controller to associate the endpoint computing device 460 with the 60 GHz portion of the available WLAN radio frequency spectrum. In such an embodiment, the SDN controller may identify all WLAN data packets received at the network slice hub 400 within the 60 GHz WLAN radio frequency band as data packets received via WLAN virtual access point 495.

The WWAN virtual access point to which the processed WWAN-compliant data frame has been routed in such an embodiment may then transmit the WWAN-compliant data frame to the backend RAN system, within the network slice associated with that WWAN virtual access point. For example, in an embodiment described with reference to FIG. 2, the WWAN virtual access point 282 (corresponding to the WWAN virtual access point 482 in FIG. 4) may transmit the WWAN-compliant data frame to the backend system within the network slice 222. As another example, the WWAN virtual access point 284 (corresponding to the WWAN virtual access point 484 in FIG. 4) may transmit the WWAN-compliant data frame to the backend system within the network slice 223. In yet another example, the WWAN virtual access point 285 (corresponding to the WWAN virtual access point 485 in FIG. 4) may transmit the WWAN-compliant data frame to the backend system within the network slice 224. In such a way, data received within a WLAN radio frequency band reserved only for a specific endpoint computing device may be transmitted to the 5G cellular network within a single network slice, also reserved for that endpoint computing device. Because reservation of portions of the available radio frequency spectrum for single endpoint devices may prohibit cross-talk, communications between the endpoint computing device and backend RAN system, as provided by the network slice hub according to embodiments described herein, may provide secure communications that may not experience interference among the plurality of endpoint computing devices.

In another aspect of an embodiment, upon processing a WWAN-compliant data frame received via WWAN virtual access point 482 into a WLAN data packet, the SDN controller of the network slice hub 400 may forward the processed WLAN data packet to the WLAN virtual access point 492 for transmission to the endpoint computing device 440. As another example, upon processing a WWAN-compliant data frame received via WWAN virtual access point 484 into a WLAN data packet, the SDN controller of the network slice hub 400 may forward the processed WLAN data packet to the WLAN virtual access point 494 for transmission to the endpoint computing device 450. In yet another example, upon processing a WWAN-compliant data frame received via WWAN virtual access point 485 into a WLAN data packet, the SDN controller of the network slice hub 400 may forward the processed WLAN data packet to the WLAN virtual access point 495 for transmission to the endpoint computing device 460.

The WWAN-compliant data frame transceived via a WWAN virtual access point in such an embodiment may be transceived within one of a plurality of network slices within which the network slice hub may transceive data with the backend RAN system. For example, in an embodiment described with reference to FIG. 2, WWAN-compliant data frames transceived via the WWAN virtual access point 282 may only be transceived within network slice 222. As another example, WWAN-compliant data frames transceived via the WWAN virtual access point 284 may only be transceived within network slice 223. In yet another example, WWAN-compliant data frames transceived via the WWAN virtual access point 285 may only be transceived within network slice 224.

The WLAN virtual access point to which the processed WLAN data packet has been routed in such an embodiment may then transmit the WLAN data packet to the endpoint computing device associated with that WLAN virtual access point, within a portion of the available WLAN radio frequency spectrum within which only the identified endpoint computing device may transceive data with the network slice hub. For example, in an embodiment described with reference to FIG. 4, the WLAN virtual access point 492 may transmit the WLAN data packet, processed from a WWAN-compliant data frame received via WWAN virtual access point 482 within a first network slice (e.g., network slice 222 from FIG. 2), to the endpoint computing device 440 within the 2.4 GHz WLAN radio frequency band, reserved by the network slice hub 400 for communication with the endpoint computing device 440. As another example, the WLAN virtual access point 494 may transmit the WLAN data packet, processed from a WWAN-compliant data frame received via WWAN virtual access point 484 within a second network slice (e.g., network slice 223 from FIG. 2), to the endpoint computing device 440 within the 5 GHz WLAN radio frequency band, reserved by the network slice hub 400 for communication with the endpoint computing device 450. In yet another example, the WLAN virtual access point 495 may transmit the WLAN data packet, processed from a WWAN-compliant data frame received via WWAN virtual access point 485 within a third network slice (e.g., network slice 224 from FIG. 2), to the endpoint computing device 460 within the 60 GHz WLAN radio frequency band, reserved by the network slice hub 400 for communication with the endpoint computing device 460. In such a way, data received within a network slice reserved only for one or more of the endpoint computing devices designated for that network slice may be transmitted to that endpoint computing device within a WLAN radio frequency band, also reserved for that endpoint computing device. Because reservation of portions of the available radio frequency spectrum for single endpoint devices may prohibit cross-talk, communications between the endpoint computing device and backend RAN system, as provided by the network slice hub according to embodiments described herein, may provide secure communications that may not experience interference among the plurality of endpoint computing devices.

In such a way, the network slice hub 400 may enable each of the WWAN virtual access points 482, 484, and 485 to transceive data between the endpoint computing devices (e.g., 440, 450, and 460, respectively) assigned to those WWAN virtual access points (e.g., 482, 484, and 485, respectively), and the backend RAN system of the 5G communication network, within the network slice requested by the endpoint computing device. The network slice hub 400 may thus communicatively couple each of the endpoint computing devices to a separate network slice of the 5G communication network. By allocating available network slices to these various endpoint computing devices, the 5G network slice hub service system of the network slice hub 400 may provide each endpoint computing device with a separate wireless signal via an available network slice meeting the specific performance or security requirements for that endpoint computing device, while avoiding cross-traffic, interference, or security breaches between or among the various network slices. The method may then end.

The blocks of the flow diagrams of FIGS. 5-6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method for facilitating transceiving of data via a network slice through a radio access network (RAN) slice hub information handling system, comprising:

transceiving data with a RAN, via a wireless wide area network (WWAN) interface device at the RAN slice hub information handling system, to establish a plurality of RAN wireless links forming a plurality of RAN network slices;

transceiving data to a local wireless local area network (WLAN) router with a first WLAN endpoint computing device, via a WLAN interface device from the RNA slice hub information handling system, the data indicating capabilities and identification of available RAN network slices via a first endpoint WLAN wireless link with the first WLAN endpoint computing devices;

receiving a request to access an available network slice from the first WLAN endpoint computing device and communicating in a first portion of available WLAN radio frequencies of the WLAN wireless link for the available RAN network slice via a virtual WLAN access point (AP) established at the RAN slice hub information handling system;

communicatively coupling, via a software defined network (SDN) controller, the WWAN interface device and WLAN interface device at the WLAN virtual AP to form a tunnel for data transceived on a first RAN network slice to be extended to the endpoint wireless link via the WLAN virtual access point on the WLAN radio frequencies; and routing data, via the SDN controller, between the WWAN interface device and the WLAN interface device on the RAN network slice extended by the SDN controller to first endpoint computing device via the WLAN virtual AP.

2. The method of claim 1 further comprising:
transceiving data with a second endpoint computing device, within a second endpoint wireless link communicating in a second portion of available WLAN radio frequencies;
communicatively coupling, via the SDN controller, the WWAN interface device and WLAN interface device at a second WLAN virtual AP to form a tunnel to extend a second RAN network slice to the second endpoint wireless link via the second WLAN virtual access point; and
routing data between the WWAN interface device and the WLAN interface device on the second RAN network slice extended by the SDN controller to the second endpoint computing device via the second WLAN virtual access point.

3. The method of claim 1 further comprising:
transceiving data pursuant to execution of an application onboard the RAN hub information handling system with the RAN, via the WWAN interface device, within a second RAN network slice of the plurality of network slices.

4. The method of claim 1 further comprising:
transceiving data with the first endpoint computing device via a second endpoint WLAN wireless link communicating in a second portion of available WLAN radio frequencies at a second virtual AP;
communicatively coupling, via the SDN controller, the WWAN interface device and WLAN interface device at the second WLAN virtual AP to form a tunnel to extend a second RAN network slice to the first endpoint device via the second endpoint wireless link and the second WLAN virtual access point; and
routing data between the WLAN interface device and the WWAN interface device on the second RAN network slice extended by the SDN controller to the first endpoint computing device.

5. The method of claim 1 further comprising:
receiving authentication credentials from the first endpoint computing device, via the WLAN interface device within the first endpoint WLAN wireless link; and
determining the authentication credentials match stored authentication credentials associated with the first endpoint computing device to permit extending the RAN network slice to the first endpoint computing device.

6. The method of claim 1, wherein at least one of the plurality of RAN wireless links operates within a high-band 5G frequency range 2 (FR2) mm-wave WWAN radio frequency range.

7. The method of claim 1, wherein at least one of the plurality of RAN wireless links operates within a mid-band 5G frequency range 1 (FR1) WWAN radio frequency range.

8. An information handling system operating a 5G network slice hub service system, comprising:
a wireless wide area network (WWAN) interface device transceiving data with a WWAN radio access network (RAN) within a plurality of WWAN wireless links, each transceiving data within one of a plurality of RAN network slices;
a wireless local area network (WLAN) interface device transceiving data to a local WLAN router with a first WLAN endpoint computing device from the 5G network slice hub service system indicating capabilities and identification of available RAN network slices via an endpoint WLAN wireless link with the first WLAN endpoint computing device;
a processor executing code instructions of the 5G network slice hub service system to establish a first WLAN virtual access point for a first portion of WLAN radio frequencies and transceiving with the first WLAN endpoint computing device;
the processor executing code instructions of the 5G network slice hub service system to establish a second WLAN virtual access point for a second portion of WLAN radio frequencies and transceiving with a second WLAN endpoint computing device;
the processor executing code instructions of the 5G network slice hub service system to instruct a software defined network (SDN) controller to communicatively couple the WWAN interface device having a first RAN network slice and WLAN interface device to form a first tunnel for the first RAN network slice for data transceived via the first WLAN virtual access point within the WLAN endpoint wireless link and with the first RAN network slice and to instruct the SDN controller to communicatively couple the WWAN interface device and WLAN interface device to form a second tunnel for a second RAN network slice for data transceived via the second WLAN virtual access point with the WLAN endpoint wireless link and the second RAN network slice; and
the SDN controller routing data between at the WLAN interface device from the WLAN endpoint wireless link and the WWAN interface device for transmission via the first RAN network slice extended to the first WLAN endpoint computing device or the second RAN network slice extended to the second WLAN endpoint computing device.

9. The information handling system of claim 8, wherein the a WLAN endpoint wireless link transceives data within a first WLAN radio band, and a second WLAN endpoint wireless link transceives data within a second WLAN radio band.

10. The information handling system of claim 8 further comprising:
the 5G network slice hub service system providing for selection of the first WLAN endpoint computing device and the second WLAN endpoint computing device as identified WLAN endpoint computing devices among a plurality of WLAN endpoint computing devices within range of the local WLAN router by a user;
the WLAN interface device transmitting an instruction to the local WLAN router to advertise performance and security capabilities for each of the plurality of RAN network slices to the first WLAN endpoint computing device and the second WLAN endpoint computing device.

11. The information handling system of claim 8, wherein the first of the plurality of RAN network slices is associated with a radio frequency range above 6 GHz.

12. The information handling system of claim 8, wherein the first of the plurality of RAN network slices is associated with a radio frequency range between 1 GHz and 6 GHz.

13. The information handling system of claim 8, wherein the first of the plurality of RAN network slices is associated with a radio frequency range below 1 GHz.

* * * * *